United States Patent
Shionozaki

(10) Patent No.: US 11,200,787 B2
(45) Date of Patent: Dec. 14, 2021

(54) ROBOT, ROBOT SYSTEM, AND STORAGE MEDIUM

(71) Applicant: SONY CORPORATION, Tokyo (JP)

(72) Inventor: Atsushi Shionozaki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 242 days.

(21) Appl. No.: 16/312,874

(22) PCT Filed: Apr. 13, 2017

(86) PCT No.: PCT/JP2017/015191
§ 371 (c)(1),
(2) Date: Dec. 21, 2018

(87) PCT Pub. No.: WO2018/008224
PCT Pub. Date: Jan. 11, 2018

(65) Prior Publication Data
US 2020/0312109 A1    Oct. 1, 2020

(30) Foreign Application Priority Data

Jul. 4, 2016   (JP) .............................. JP2016-132629

(51) Int. Cl.
*G08B 21/02* (2006.01)
*G05D 1/02* (2020.01)
(Continued)

(52) U.S. Cl.
CPC ........... *G08B 21/02* (2013.01); *G05D 1/0214* (2013.01); *G05D 1/0287* (2013.01); *G06N 3/008* (2013.01); *G08B 21/18* (2013.01); *G08B 25/10* (2013.01)

(58) Field of Classification Search
CPC ........ G08B 21/02; G08B 21/18; G08B 25/10; G05D 1/0214; G05D 1/0287; G05D 1/0291; G06N 3/008
See application file for complete search history.

(56) References Cited

U.S. PATENT DOCUMENTS

| 6,529,802 B1 | 3/2003 | Kawakita et al. |
| 6,687,571 B1 | 2/2004 | Byrne et al. |

(Continued)

FOREIGN PATENT DOCUMENTS

| CN | 1313803 A | 9/2001 |
| CN | 1553845 A | 12/2004 |

(Continued)

OTHER PUBLICATIONS

English translation of CN-103869824-A, Liu Xiaofeng (Year: 2014).*

(Continued)

*Primary Examiner* — Jeff A Burke
*Assistant Examiner* — Mohamad O El Sayah
(74) *Attorney, Agent, or Firm* — Chip Law Group

(57) ABSTRACT

A robot in a robot system including a plurality of robots each having a function of identifying a monitoring target and transmitting information related to the monitoring target to a remote site. The robot includes an acquiring unit that acquires sensing data related to the monitoring target, a communication unit that communicates with another nearby robot, and a control unit that controls the communication unit such that an alert mode transition request signal is transmitted to the other nearby robot if it is determined that a first monitoring target is in an abnormal state on a basis of the sensing data. The robot transitions to an alert mode in which a process according to the received alert mode transition request signal is performed if the alert mode transition request signal related to a second monitoring target is received.

18 Claims, 23 Drawing Sheets

(51) Int. Cl.
  *G06N 3/00* (2006.01)
  *G08B 21/18* (2006.01)
  *G08B 25/10* (2006.01)

(56) References Cited

U.S. PATENT DOCUMENTS

| 2004/0153211 A1 | 8/2004 | Kamoto et al. | |
|---|---|---|---|
| 2007/0019291 A1 | 1/2007 | Nam et al. | |
| 2007/0192910 A1* | 8/2007 | Vu | B25J 19/06 700/245 |
| 2009/0015404 A1* | 1/2009 | Lin | B25J 9/1682 340/540 |
| 2012/0316677 A1 | 12/2012 | Sato | |

FOREIGN PATENT DOCUMENTS

| CN | 1877475 A | 12/2006 |
|---|---|---|
| CN | 2909416 Y | 6/2007 |
| CN | 101303589 A | 11/2008 |
| CN | 101599205 A | 12/2009 |
| CN | 101673453 A | 3/2010 |
| CN | 102096415 A | 6/2011 |
| CN | 102289556 A * | 12/2011 |
| CN | 102770820 A | 11/2012 |
| CN | 103608741 A | 2/2014 |
| CN | 103716867 A | 4/2014 |
| CN | 103835749 A | 6/2014 |
| CN | 103869824 A * | 6/2014 |
| CN | 104685432 A | 6/2015 |
| CN | 204480441 U | 7/2015 |
| CN | 204903769 U | 12/2015 |
| CN | 105308658 A | 2/2016 |
| EP | 1122038 A1 | 8/2001 |
| EP | 2518579 A1 | 10/2012 |
| JP | 2000-263489 A | 9/2000 |
| JP | 2002-254374 A | 9/2002 |
| JP | 2002254374 A * | 9/2002 |
| JP | 2003-109160 A | 4/2003 |
| JP | 2003-205483 A | 7/2003 |
| JP | 2005-319526 A | 11/2005 |
| JP | 2006-344075 A | 12/2006 |
| JP | 2007-296586 A | 11/2007 |
| JP | 2009-050970 A | 3/2009 |
| JP | 2009050970 A * | 3/2009 |
| JP | 2009-205644 A | 9/2009 |
| JP | 4328997 B2 | 9/2009 |
| JP | 4537464 A | 9/2010 |
| JP | 4537464 B2 | 9/2010 |
| JP | 2012038339 A * | 2/2012 |
| JP | 5745429 B2 | 7/2015 |
| KR | 10-2001-0052807 A | 6/2001 |
| KR | 10-2007-0045641 A | 5/2007 |
| KR | 10-2010-0004550 A | 1/2010 |
| KR | 10-0967275 B1 | 7/2010 |
| KR | 10-1008085 B1 | 1/2011 |
| KR | 10-2012-0106772 A | 9/2012 |
| KR | 101390204 B1 | 4/2014 |
| TW | 200903391 A | 1/2009 |
| WO | 99/67067 A1 | 12/1992 |
| WO | 99/067067 A1 | 12/1999 |
| WO | 99/67067 A1 | 12/1999 |
| WO | 03/039818 A2 | 5/2003 |
| WO | 2011/077730 A1 | 6/2011 |

OTHER PUBLICATIONS

English translation of JP-2012038339-A, Mizushina, Takahiro, (Year: 2012).*

English translation of JP-2009050970-A, Mochizuki, Toshimasa (Year: 2009).*

English translation of JP-2002254374-A, Takeno, Takakimi (Year: 2002).*

Machine translation of CN-102289556-A (Year: 2011).*

International Search Report and Written Opinion of PCT Application No. PCT/JP2017/015191, dated Jun. 20, 2017, 06 pages of ISRWO and 02 pages of ISR translation.

Extended European Search Report of EP Patent Application No. 17823832.5, dated Jun. 12, 2019, 17 pages.

Tuna, et al., "Autonomous Intruder Detection System Using Wireless Networked Mobile Robots", Proceedings of the 2012 IEEE Symposium on Computers and Communications (ISCC), Jul. 1-4, 2012, pp. 1-5.

Wang, et al., "Using Robotic Sensor Networks to Build a Search and Rescue Application", 2nd International Conference on Applied Robotics for the Power Industry (CARPI 2012), Sep. 2012, pp. 1002-1005.

Clark, et al., "Cooperative Hybrid Control of Robotic Sensors for Perimeter Detection and Tracking", Proceedings of the 2005, American Control Conference, Jun. 8-10, 2005, pp. 3500-3505.

Khaluf, et al., "Self-Organized Cooperation in Swarm Robotics", 2011 14th IEEE International Symposium on Object/Component/Service-Oriented Real-Time Distributed Computing Workshops, Mar. 23-28, 2011, pp. 217-226.

Martinez-Gracia, et al.,"Trajectory Control for Groups of Humans by Deploying a Team of Mobile Robots", ICAR '05 Proceedings , 12th International Conference on Advanced Robotics, Jul. 18-20, 2005, pp. 733-740.

Edgar Martinez Garcia, et al., "Trajectory Control for Groups of Humans by Deploying a Team of Mobile Robots", Advanced Robotics, No. 12, Jul. 18, 2005, 08 pages.

Office Action for CN Patent Application No. 201780040753.7, dated Jul. 23, 2020, 7 pages of Office Action and 15 pages of English Translation.

Office Action for JP Patent Application No. 2018-525942 dated Dec. 15, 2020, 02 pages of Office Action and 02 pages of English Translation.

Office Action for KR Patent Application No. 10-2018-7035093 dated Jan. 27, 2021, 04 pages of Office Action and 06 pages of English Translation.

Extended European Search Report of EP Application No. 20216220 dated Apr. 30, 2021, 14 pages.

Tuna, et al., "Autonomous Intruder Detection System Using Wireless Networked Mobile Robots", IEEE Symposium on Computers and Communications, Jul. 31, 2012, 05 pages.

Clark, et al., "Cooperative Hybrid Control of Robotic Sensors for Perimeter Detection and Tracking", American Control Conference, 2005, Jun. 8-10, 2005, pp. 3500-3505.

Khaluf, et al., "Self-organized Cooperation in Swarm Robotics", I4th IEEE International Symposium on Object/Component/Service-Oriented Real-Time Distributed Computing Workshops, Mar. 28, 2011, pp. 217-226.

Martinez-Garcia, et al., "Trajectory Control for Groups of Humans by Deploying a Team of Mobile Robots", 12th International Conference On Advanced Robotics, Jul. 18-20, 2005, pp. 733-740.

Wang, et al., "Using Robotic Sensor Networks to Build a Search and Rescue Application", 2nd International Conference on Applied Robotics for the Power Industry, Sep. 11, 2012, pp. 1002-1005.

Office Action for CN Patent Application No. 201780040753.7, dated May 14, 2021, 12 pages of English Translation and 08 pages of Office Action.

Office Action for KR Patent Application No. 10-2018-7035093, dated Jun. 4, 2021, 02 pages of English Translation and 02 pages of Office Action.

* cited by examiner

ROBOT, ROBOT SYSTEM, AND STORAGE MEDIUM

CROSS REFERENCE TO RELATED APPLICATIONS

This application is a U.S. National Phase of International Patent Application No. PCT/JP2017/015191 filed on Apr. 13, 2017, which claims priority benefit of Japanese Patent Application No. JP 2016-132629 filed in the Japan Patent Office on Jul. 4, 2016. Each of the above-referenced applications is hereby incorporated herein by reference in its entirety.

TECHNICAL FIELD

The present disclosure relates to a robot, a robot system, and a storage medium.

BACKGROUND ART

In recent years, provision of services using an autonomously operable robot has been under active review. For example, the use of robots including various sensors for acquiring information, an input/output device for performing an interaction with a user, a communication interface for communicating with other robots, and the like has been under review. Further, techniques in which a plurality of robots are prepared and caused to operate in cooperation with one another while sharing information with one another have also been under review.

For example, a technique in which a plurality of mobile apparatuses track a target while sharing sensor information related to the target is disclosed in Patent Literature 1. Further, a technique of providing a service corresponding to a request of a user while cooperating with a network robot is disclosed in Patent Literature 2. Further, a technique in which a plurality of robots avoid a collision while sharing information and cooperating with one another is disclosed in Patent Literature 3.

CITATION LIST

Patent Literature

Patent Literature 1: JP 2006-344075A
Patent Literature 2: JP 2005-319526A
Patent Literature 3: JP 2002-254374A

DISCLOSURE OF INVENTION

Technical Problem

However, the techniques disclosed in the patent literatures are merely techniques in which a plurality of robots supplement insufficient information and cooperate with one another. For example, if a situation in which each user owns a robot is assumed, since the robots belongs to individual users, it may be difficult for each robot to cooperate with other robots while ignoring its own user. In this regard, it is desirable to provide a mechanism which is capable of implementing both provision of a service to a robot's own user and assistance with provision of services to other users by other robots.

Solution to Problem

According to the present disclosure, there is provided a robot in a robot system including a plurality of robots each having a function of identifying a monitoring target and transmitting information related to the monitoring target to a remote site, the robot including: an acquiring unit configured to acquire sensing data related to the monitoring target; a communication unit configured to communicate with another nearby robot; and a control unit configured to control the communication unit such that an alert mode transition request signal is transmitted to the other nearby robot if it is determined that a first monitoring target is in an abnormal state on a basis of the sensing data and transition to an alert mode in which a process according to the received alert mode transition request signal is performed if the alert mode transition request signal related to a second monitoring target is received.

In addition, according to the present disclosure, there is provided an information processing apparatus in a robot system capable of communicating with a plurality of robots capable of monitoring a monitoring target, the information processing apparatus including: a communication unit configured to receive sensing data acquired by the robot for the monitoring target monitored by the robot and position information of the robot; a storage unit configured to store the position information received from the robot; and a control unit configured to specify a second robot located near a first robot with reference to the storage unit if it is determined that a monitoring target of the first robot is in an abnormal state on a basis of sensing data of the first robot, control the communication unit such that an alert mode transition request signal is transmitted to the second robot, specify the first robot located near the second robot with reference to the storage unit if it is determined that a monitoring target of the second robot is in an abnormal state on a basis of sensing data of the second robot, and control the communication unit such that an alert mode transition request signal is transmitted to the first robot.

In addition, according to the present disclosure, there is provided a recording medium having a program recorded therein, the program causing a computer to function as: in a robot system including a plurality of robots each having a function of identifying a monitoring target and transmitting information related to the monitoring target to a remote site, an acquiring unit configured to acquire sensing data related to the monitoring target; a communication unit configured to communicate with another nearby robot; and a control unit configured to control the communication unit such that an alert mode transition request signal is transmitted to the other nearby robot if it is determined that a first monitoring target is in an abnormal state on a basis of the sensing data and transition to an alert mode in which a process according to the received alert mode transition request signal is performed if the alert mode transition request signal related to a second monitoring target is received.

Advantageous Effects of Invention

As described above, according to the present disclosure, a mechanism which is capable of implementing both provision of a service to a robot's own user and supporting provision of services to other users by other robots is provided. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
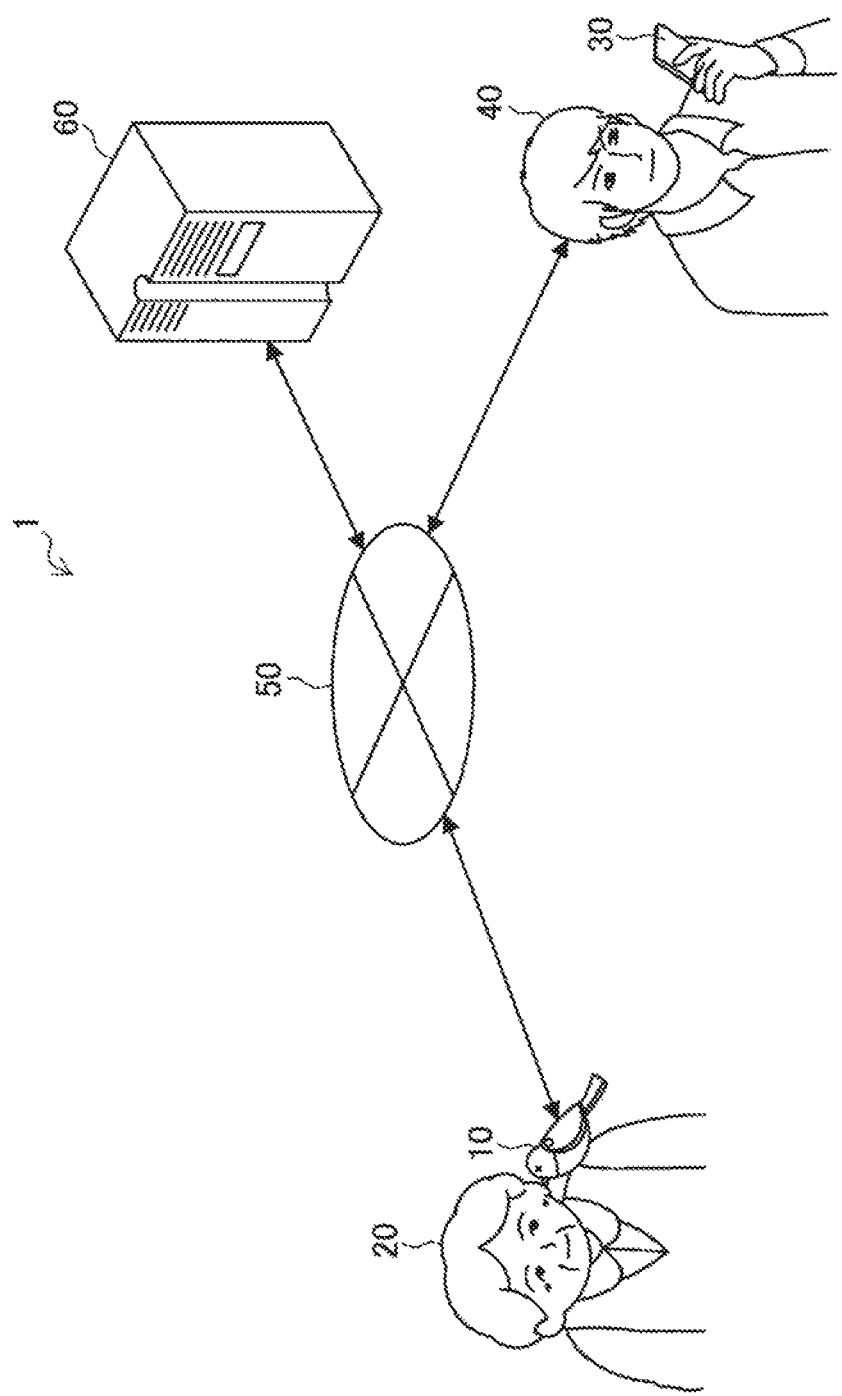
FIG. 1 is a diagram for describing an overview of a robot system according to one embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, in this specification and the appended drawings, components that have substantially the same function and structure are sometimes distinguished from each other by postfixing the same reference numerals with different alphabets. For example, a plurality of components that have substantially the same function and structure are distinguished from each other as necessary like robots 10A, 10B, and 10C. Nevertheless, in a case where a plurality of components that have substantially the same function and structure need not be specifically distinguished from each other, these components may be denoted only with the same reference numerals. For example, in a case where the robots 10A, 10B, and 10C need not be specifically distinguished from each other, they are simply referred to as the robots 10.

Further, the description will proceed in the following order.

1. Overview
2. Configuration example
2.1. Configuration example of robot
2.2. Configuration example of server
3. Technical features
3.1. Basic technology
3.2. First abnormal state
3.3. Response to second abnormal state
3.4. Group monitoring mode
3.5. Consideration of first monitoring target
3.6. Transfer of alert mode transition request signal
4. Modified example
5. Hardware configuration example
6. Conclusion

1. OVERVIEW

First, an overview of a robot system according to one embodiment of the present disclosure will be described with reference to FIGS. 1 and 2.

FIG. 1 is a diagram for describing an overview of a robot system according to the present embodiment. As illustrated in FIG. 1, a robot system 1 includes a robot 10, a terminal apparatus 30, and a server 60.

The robot 10 is an apparatus having a function of monitoring a monitoring target 20 and transmitting information related to the monitoring target 20 to a remote site. The robot 10 acquires the information related to the monitoring target 20 through a sensor or the like, and transmits the acquired information to the terminal apparatus 30 of a monitoring requester 40 at the remote site via a network 50. For example, the robot 10 is a pet type robot, the monitoring target 20 is an owner of the robot 10, and the monitoring requester 40 is a family member of an owner 20. With such a remote monitoring system, for example, a family member 40 is able to check that the owner 20 is healthy from the remote site. Further, the robot 10 can operate autonomously and can monitor while following the monitoring target 20.

The terminal apparatus 30 is an apparatus that receives the information related to the monitoring target 20 from the robot 10 and transmits a manipulation instruction to the robot 10. For example, the terminal apparatus 30 is a smartphone, a tablet terminal, a personal computer (PC), or the like.

The server 60 is installed on, for example, a cloud and manages one or more robots 10 included in the robot system 1. For example, the server 60 detects position information of the robot 10 that it supervises, and replays communication between the robot 10 and the terminal apparatus 30 and communication between a plurality of robots 10.

The network 50 is a wired or wireless transmission path of information transmitted from an apparatus connected to the network 50. Examples of the network 50 include a local area network (LAN), a wireless LAN, Bluetooth (registered trademark), a Long Term Evolution (LTE) network, or the like.

Figure 2:
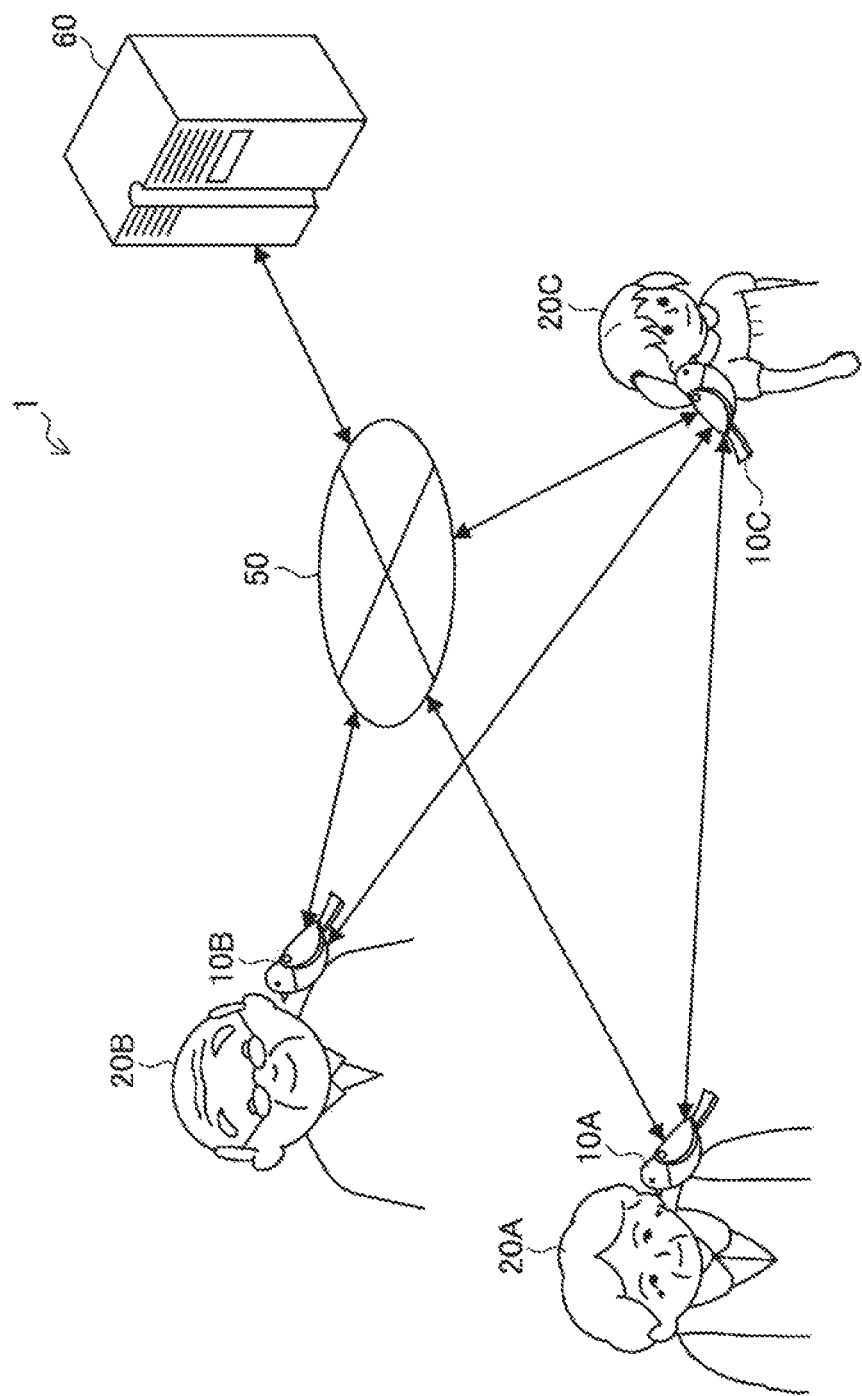
FIG. 2 is a diagram for describing an overview of a robot system according to the present embodiment.

FIG. 2 is a diagram for describing an overview of the robot system 1 according to the present embodiment. As illustrated in FIG. 2, the robot system 1 may include a plurality of robots 10. A robot 10A monitors an owner 20A, a robot 10B monitors an owner 20B, and a robot 10C monitors an owner 20C.

The robots 10 may perform indirect communication with each other via the server 60. For example, the robots 10A and 10B indirectly communicate with each other via the network 50 and the server 60. On the other hand, the robots 10 may perform direct communication without going through the server 60. For example, the robots 10B and 10C or the robots 10A and 10C communicate directly with each other without going through the server 60.

Further, the robot 10 is a bird type in FIGS. 1 and 2, but may be any type such as a dog type, a cat type, or the like. Further, in addition to the pet type that is consistently associated with the owner 20, the robot 10 may be a robot appropriately associated with an arbitrary monitoring target such as, for example, a security robot, a cleaning robot, or the like.

In the robot system 1 according to the present embodiment, the robot 10 is assumed to monitor the owner 20 as the monitoring target as a basic operation. An operation mode in which the basic operation is performed is also referred to as a normal mode, and an operation in the normal mode is also referred to as a normal mode operation.

On the other hand, in a case in which an abnormal state occurs, the robot 10 performs an operation for resolving the abnormal state (hereinafter also referred to as an alert mode operation). For example, in a case in which the owner 20 is in the abnormal state, the robot 10 transmits a signal indicating that he or she is in the abnormal state to other robots 10 and urges assistance for resolving the abnormal state of the owner 20. On the other hand, in a case in which the signal indicating the abnormal state is received from another robot 10, the robot 10 assists in resolving the abnormal state of the owner 20 of the other robot 10. The operation mode in which the alert mode operation is performed is hereinafter also referred to as an alert mode. Further, the signal indicating the abnormal state is hereinafter also referred to as an alert mode transition request signal. Further, the robot 10 serving as a transmission source of the alert mode transition request signal is referred to simply as a robot 10 of a transmission source, and the robot 10 that receives the alert mode transition request signal other than the transmission source is also referred to simply as a robot 10 of a reception destination.

The overview of the robot system according to the present embodiment has been described above.

Hereinafter, a monitoring target associated with the robot 10 is also referred to as a first monitoring target. Further, a monitoring target other than the first monitoring target is also referred to as a second monitoring target. The first monitoring target is typically a holder or owner of the robot 10. The second monitoring target may be an owner of another robot 10 or may be a person who does not own the robot 10. Hereinafter, in a case in which there is no need to particularly distinguish between the first monitoring target and the second monitoring target, they are collectively referred to simply as a monitoring target.

2. CONFIGURATION EXAMPLE

Next, configuration examples of the respective apparatuses will be described with reference to FIGS. 3 and 4. Further, a configuration of the terminal apparatus 30 is similar to that of a general smartphone or the like, and thus a detailed description thereof will be omitted.

<2.1. Configuration Example of Robot>

Figure 3:
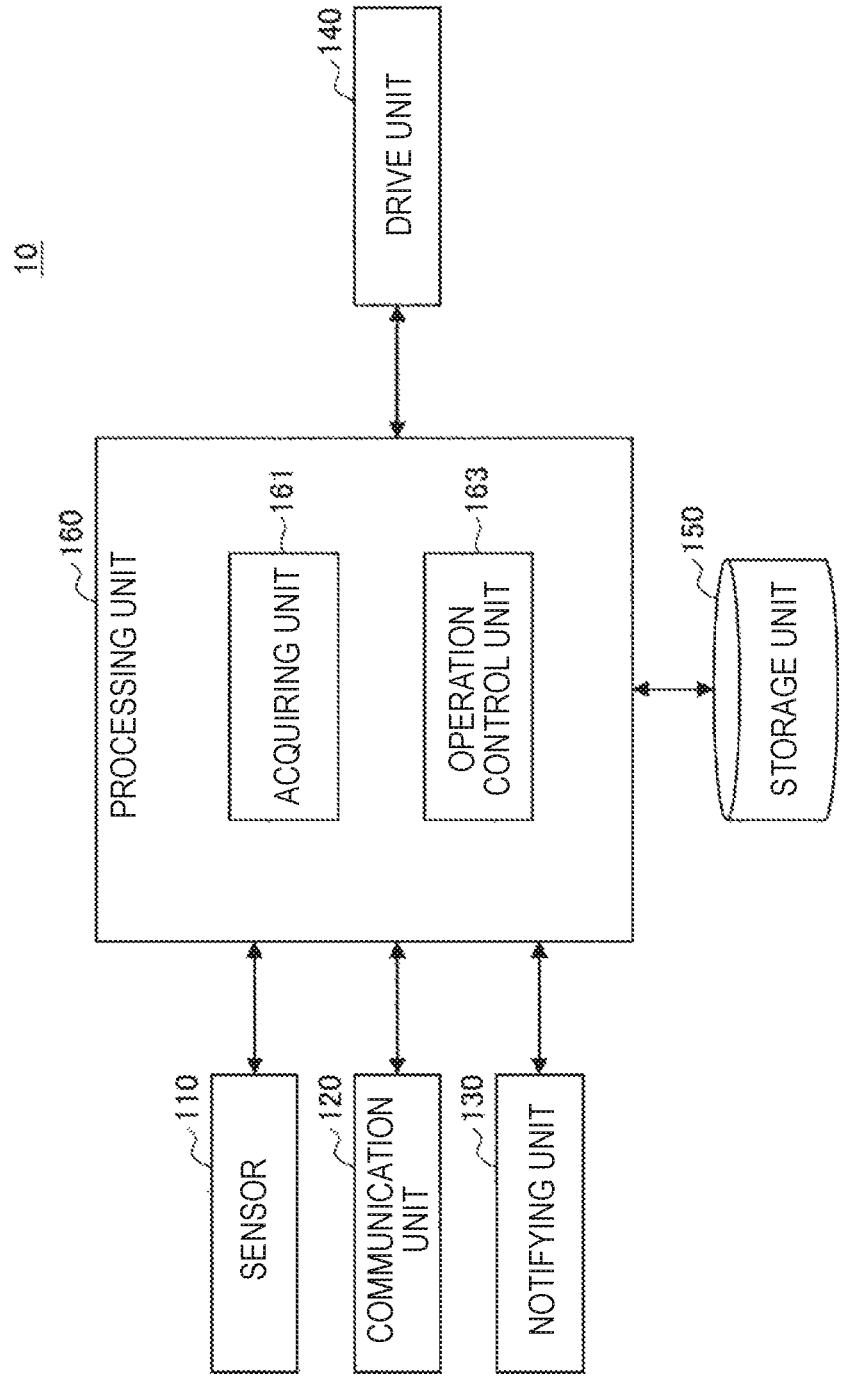
FIG. 3 is a block diagram illustrating an example of a logical configuration of a robot according to the present embodiment.

FIG. 3 is a block diagram illustrating an example of a logical configuration of the robot 10 according to the present embodiment. As illustrated in FIG. 3, the robot 10 includes a sensor 110, a communication unit 120, a notifying unit 130, a drive unit 140, a storage unit 150, and a processing unit 160.

(Sensor 110)

The sensor 110 performs sensing related to the monitoring target. The sensor 110 may include a sensor that senses the monitoring target or an area around the monitoring target such as a camera, a microphone, an ultrasonic sensor, an infrared sensor, a biological sensor, a laser range finder, or the like. Further, the sensor 110 may include a sensor that senses a state of the robot 10 such as, for example, a global navigation satellite system (GNSS) positioning module, an acceleration sensor, a gyroscope sensor, a geomagnetic sensor, or the like.

(Communication unit 120)

The communication unit 120 transmits and receives signals. For example, the communication unit 120 communicates with other robots 10, the terminal apparatus 30, or the server 60. At this time, the communication unit 120 may perform communication in accordance with a wireless communication standard such as, for example, a wireless LAN. In addition, the communication unit 120 may transmit and receive a signal to/from a device worn or carried by the monitoring target. For example, the communication unit 120 may receive a beacon (for example, a Bluetooth low energy (BLE) beacon) transmitted from a device worn by the monitoring target. The beacon may include identification information identifying a wearer.

(Notifying Unit 130)

The notifying unit 130 outputs information. For example, the notifying unit 130 may include a display, a projector, a lighting, a rotary beacon light, a speaker, a vibration device, or the like. The notifying unit 130 outputs information individually to the first monitoring target or notifies nearby people of information.

(Drive Unit 140)

The drive unit 140 preforms driving for an autonomous operation of the robot 10. Specifically, the drive unit 140 drives the robot 10 to move in a real space. For example, the drive unit 140 includes a battery, a motor, and the like, and causes the bird-type robot 10 to take a posture of flapping or gliding.

(Storage Unit 150)

The storage unit 150 temporarily or permanently stores a program and various data for the operation of the robot 10.

(Processing Unit 160)

The processing unit 160 provides various functions of the robot 10. The processing unit 160 includes an acquiring unit 161 and an operation control unit 163. Further, the processing unit 160 may further include components other than these components. In other words, the processing unit 160 may also perform operations other than those performed by these components.

The acquiring unit 161 has a function of acquiring sensing data. The operation control unit 163 has a function of controlling the entire operation of the robot 10. For example, the operation control unit 163 sets the operation mode on the basis of the sensing data acquired by the acquiring unit 161, and controls the operation of the communication unit 120, the notifying unit 130, the drive unit 140, the storage unit 150, or the like in accordance with the set operation mode. Further, controlling the communication unit 120 such that information is transmitted or received by the processing unit 160 is hereinafter also described simply as transmitting or receiving. The same applies to the notifying unit 130, the drive unit 140, and the like.

<2.2. Configuration Example of Server>

Figure 4:
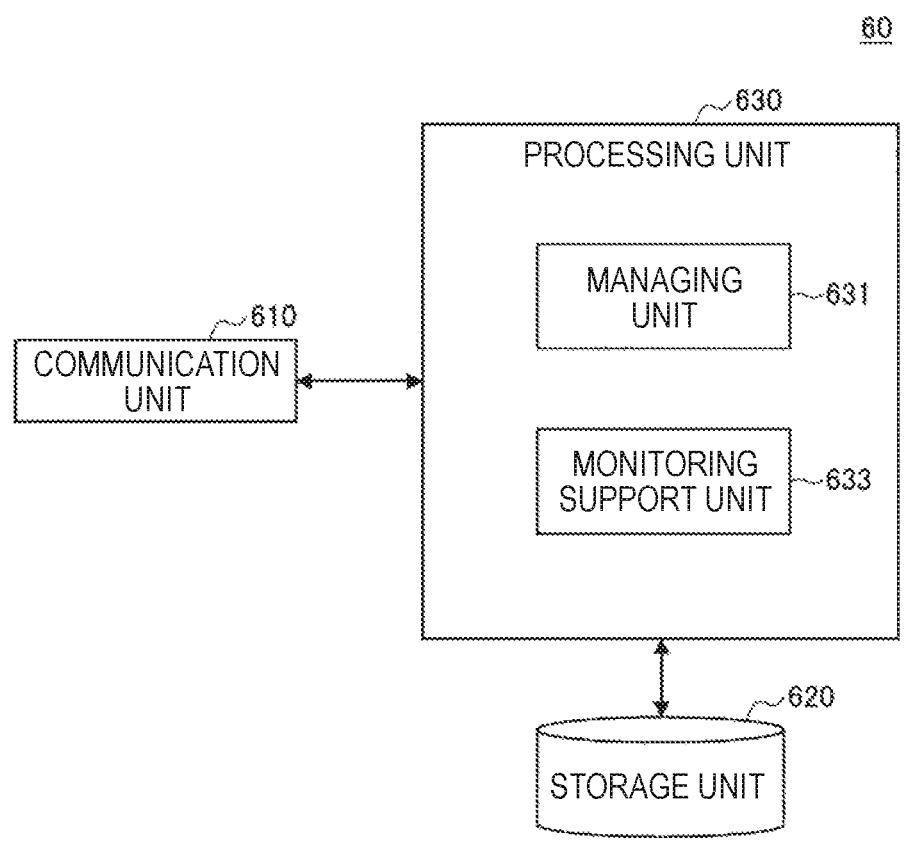
FIG. 4 is a block diagram illustrating an example of a logical configuration of a server according to the present embodiment.

FIG. 4 is a block diagram illustrating an example of a logical configuration of the server 60 according to the present embodiment. As illustrated in FIG. 4, the server 60 includes a communication unit 610, a storage unit 620, and a processing unit 630.

(Communication Unit 610)

The communication unit 610 performs transmission and reception of signals. For example, the communication unit 610 receives signals from the robot 10 or the terminal apparatus 30 and transmits signals to the robot 10 or the terminal apparatus 30. At this time, the communication unit 610 may perform communication in accordance with an arbitrary wireless/wired communication standard.

(Storage Unit 620)

The storage unit 620 temporarily or permanently stores a program and various types of data for the operation of the server 60.

(Processing Unit 630)

The processing unit 630 provides various functions of the server 60. The processing unit 630 includes a managing unit 631 and a monitoring support unit 633. Further, the processing unit 630 may further include components other than these components. In other words, the processing unit 630 may also perform operations other than those performed by these components.

The managing unit 631 has a function of managing information of the robot 10 included in the robot system 1. Further, the monitoring support unit 633 has a function of supporting the monitoring process for the monitoring target by the robot 10 included in the robot system 1. For example, the monitoring support unit 633 relays an information transmission/reception process between a plurality of the robots 10.

3. TECHNICAL FEATURES

<3.1. Basic Technology>

Next, a basic technology of the robot 10 according to the present embodiment will be described.

(1) Management of Plurality of Robots

The server 60 manages the information of the robot 10. For example, the server 60 stores the position information of the robot 10 that it supervises as shown in Table 1 below.

TABLE 1

| Identification information | Position information | ... |
|---|---|---|
| I D 0 0 0 | Position information 0 0 0 | ... |
| I D 0 0 1 | Position information 0 0 1 | ... |
| ... | ... | ... |

Further, the server 60 may store various other types of information. For example, the server 60 may store information related to the first monitoring target (for example, identification information, attribute information, information related to family members, or the like). Further, the server 60 may store information related to a person associated with the first monitoring target or information related to other robots 10 regarding a group monitoring mode to be described later. The robot 10 transmits such information to the server 60 at regular intervals or at a timing at which there is a change in the information, and the server 60 updates the information.

(2) Monitoring

The robot 10 identifies the monitoring target and monitors the identified monitoring target.

The robot 10 may store various types of information for monitoring. For example, the robot 10 may store the identification information of the first monitoring target. The identification information of the first monitoring target may include, for example, an ID of a beacon transmitted from the device worn by the first monitoring target, feature point information for image recognition, voice waveform information, or the like. Further, the robot 10 can store its position information. The position information may include information indicating a latitude and a longitude, a building in which the robot 10 is present, or the like. Further, the robot 10 may store identification information of other persons. The identification information may include an ID of a beacon, feature point information, voice waveform information, or the like. For example, other persons may be persons associated with the first monitoring target such as an acquaintance, a friend, and the like of the first monitoring target or persons designated in the alert mode transition request signal from other robots 10 or the server 60. Further, the robot 10 may store identification information of other robots 10. The identification information may include an ID of a beacon transmitted from the robot 10, information obtained by a proximity sensor, or the like. Further, the robot 10 may store the identification information of the alert mode transition request signal and information indicating the alert mode operation corresponding to the identification information.

The monitoring operation by the robot 10 will be described below.

First, the robot 10 acquires sensing data related to the monitoring target. The sensing data may include a sensing result by the internal sensor 110, a sensing result by a device worn or carried by the monitoring target, and a sensing result of radio waves (for example, a beacon) from a device worn or carried by the monitoring target. Then, the robot 10 identifies the monitoring target on the basis of the sensing data and the identification information of the monitoring target, follows the identified monitoring target, and performs the monitoring.

Here, monitoring the monitoring target by the robot 10 means that the robot 10 operates (for examples, moves) so that the monitoring target is within a sensing range, and continuously senses the monitoring target. The sensing range is hereinafter also referred to as a monitorable range.

Further, the monitoring is assumed to be a concept including a search which is an operation for causing the monitoring target outside the monitorable range to be included in the monitorable range.

The robot 10 moves under the condition that the first monitoring target is included in the monitorable range of the robot 10. Accordingly, the robot 10 can continuously monitor the first monitoring target, and it is possible to prevent, for example, losing sight (that is, the first monitoring target from deviating from the monitorable range). In FIGS. 1 and 2, the robot 10 is located at a shoulder of the first monitoring target (the owner 20) but can be located at an arbitrary place within the range in which the first monitoring target is included in the monitorable range, and for example, the robot 10 may sit on an electric wire or may turn around overhead.

The robot 10 can search for a search target which is not included in the monitorable range. The searching for the search target by the robot 10 means sensing surrounding areas while moving in order to find the search target which is not included in the monitorable range. The search target may be the first monitoring target or the second monitoring target. Searching successfully means that the search target is included within the monitorable range, and it is possible to continuously perform sensing.

Here, a case in which "monitoring" in the normal mode operation also includes an operation of searching for the first monitoring target (that is, the search target) temporarily deviated from the monitorable range and causing the first monitoring target to be included within the monitorable range again is considered. In this case, the alert mode operation and the normal mode operation are identical for the first monitoring target. In other words, the robot 10 may regard that it does not transition to the alert mode when the first monitoring target is searched.

The robot 10 identifies the first monitoring target and monitors the first monitoring target while interacting with the first monitoring target. Then, the robot 10 detects the abnormal state of the first monitoring target on the basis of the sensing data.

If it is determined that the first monitoring target is abnormal on the basis of the sensing data, the robot 10 transmits the alert mode transition request signal to other nearby robots 10. Accordingly, the robot 10 causes the other nearby robots 10 to transition to the alert mode. At this time, the robot 10 itself may also transition to the alert mode. Further, the robot 10 may repeatedly transmit the same alert mode transition request signal.

Further, if the alert mode transition request signal related to the second monitoring target is received, the robot 10 transitions to the alert mode in which a process according to the received alert mode transition request signal is performed. In a case in which the same alert mode transition request signal is received, the robot 10 may ignore it except for a first one, and may reflect it in a case in which information is updated. The transmission source of the alert mode transition request signal may be another robot 10 or the server 60. For example, the server 60 may transmit the alert mode transition request signal in response to a request from police.

When the transition to the alert mode is performed, the robot 10 may give a notification indicating that the transition to the alert mode is performed to the first monitoring target. On the other hand, the robot 10 may omit the notification if necessary or give a notification using, for example, only vibration so that a nearby person does not notice it. Accordingly, it is possible for the robot 10 to transition to the alert mode without being noticed by a nearby person.

Further, the robot 10 may not transition to the alert mode even when the alert mode transition request signal is received. For example, the robot 10 may control whether or not the transition to the alert mode is performed in accordance with content of the occurred abnormal state. Further, the robot 10 may perform the transition to the alert mode based on the alert mode transition request signal only in a case in which it is permitted by the first monitoring target. Further, the robot 10 may be set not to transition to the alert mode based on the alert mode transition request signal (that is, opt-out).

In a case in which an alert mode release request occurs after the transition to the alert mode is performed, the robot 10 releases the alert mode and transitions to the normal mode. The alert mode release request can occur at an arbitrary timing. For example, the robot 10 of the transmission source releases the alert mode in a case in which the abnormal state of the first monitoring target is resolved. Further, the robot 10 of the reception destination releases the alert mode in a case in which the abnormal state of the second monitoring target related to the received alert mode transition request signal is resolved. In addition, the robot 10 may release the alert mode on the basis of the lapse of time, an instruction from the first monitoring target, or the like.

(3) Transmission Path

The alert mode transition request signal may be transmitted indirectly via the server 60. In this case, the robot 10 transmits the alert mode transition request signal to the server 60, the server 60 extracts other robots 10 near the robot 10 of the transmission source from the management DB, and transfers the alert mode transition request signal. In the management DB, in addition to the position information, a degree of reliability of the position information, an update time of the position information, and the like may be included, and it may be preferentially transferred to another robot 10 which is high in a probability that it is closer to the robot 10. As the position information of the robot 10 of the transmission source, information registered in the management DB may be used, or the position information of the robot 10 of the transmission source may be included in the alert mode transition request signal.

Further, the alert mode transition request signal may be transmitted directly without going through the server 60. In this case, the robot 10 transmits the alert mode transition request signal to the range in which radio waves can reach in accordance with an arbitrary communication standard such as a wireless LAN or Bluetooth.

The transmission path of the alert mode transition request signal may be switched if necessary. For example, the alert mode transition request signal may be transmitted directly in a case in which there are an enough number of robots 10 that can perform direct communicate nearby or may be transmitted indirectly otherwise. Further, in a case in which a degree of urgency is high, both indirect transmission and direct transmission may be performed. It is because direct communication is generally considered to be shorter in communication path and faster in response, but there may be a situation in which it is difficult to perform direct communication although it is nearby.

An example of a flow of a transmission/reception process of the alert mode transition request signal will be described below with reference to FIGS. 5 to 7.

Figure 5:
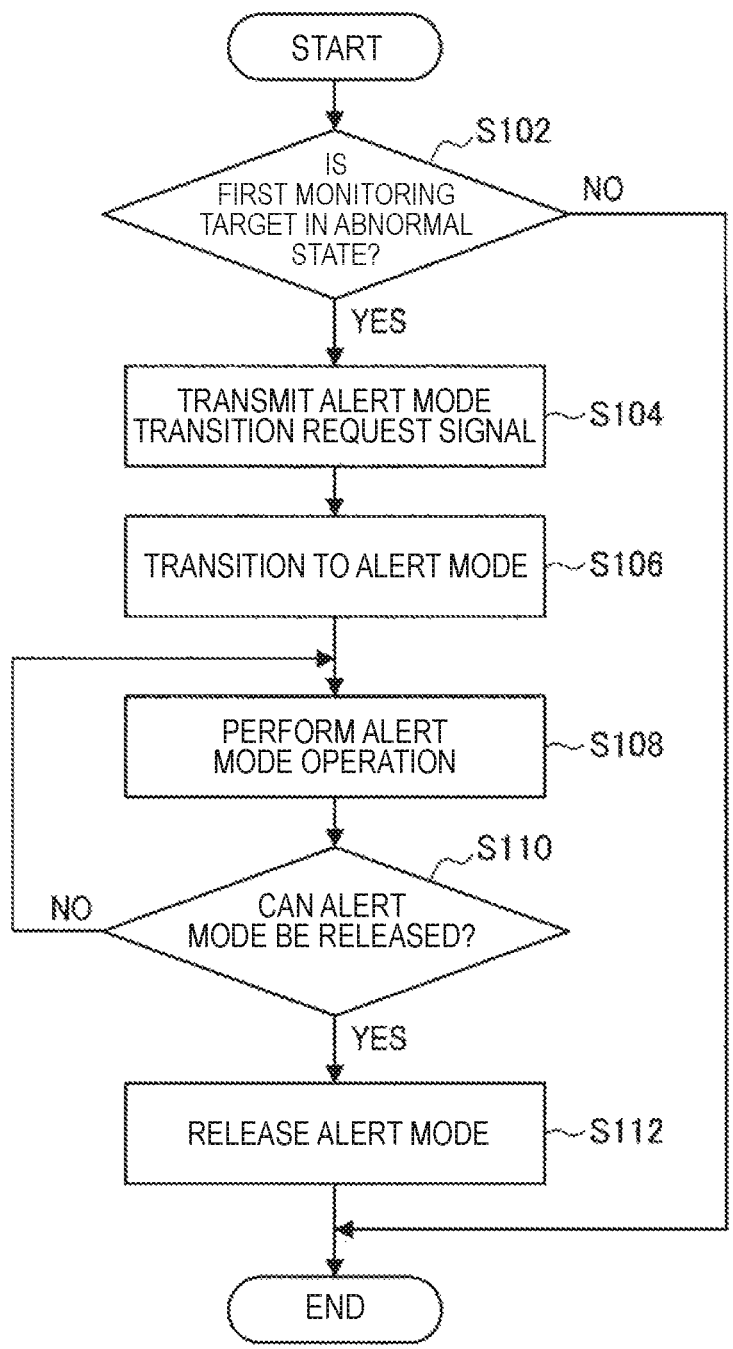
FIG. 5 is a flowchart illustrating an example of a flow of an alert mode transition request signal transmission process executed in a robot of a transmission source according to the present embodiment.

FIG. 5 is a flowchart illustrating an example of a flow of an alert mode transition request signal transmission process executed in the robot 10 of the transmission source according to the present embodiment. As illustrated in FIG. 5, first, the robot 10 determines whether or not the first monitoring target is in the abnormal state (step S102). In a case in which it is determined that the first monitoring target is in the abnormal state (YES in step S102), the robot 10 transmits the alert mode transition request signal to other robots 10 (step S104) and transitions to the alert mode (step S106). Then, the robot 10 performs the alert mode operation (step S108). The robot 10 continues to perform the alert mode operation until it is determined that the alert mode can be released (NO in step S110 and step S108) and releases the alert mode in a case in which it is determined that the alert mode can be released (YES in step S110 and step S112). Thereafter, the robot 10 returns to the normal mode operation. On the other hand, in a case in which it is determined that t is the normal state (NO in step S102), the robot 10 continues to perform the normal mode operation.

Figure 6:
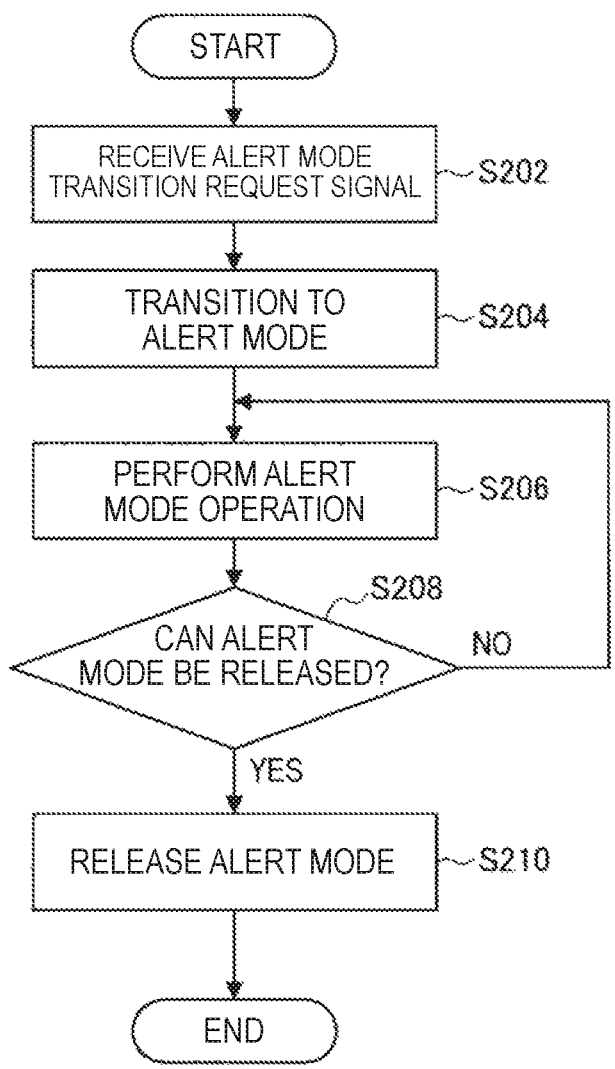
FIG. 6 is a flowchart illustrating an example of a flow of an alert mode transition request signal reception process executed in a robot of a reception destination according to the present embodiment.

FIG. 6 is a flowchart illustrating an example of a flow of an alert mode transition request signal reception process executed in the robot 10 of the reception destination according to the present embodiment. As illustrated in 6, first, if the alert mode transition request signal is received from another robot 10 (step S202), the robot 10 transitions to the alert mode (step S204) and performs the alert mode operation (step S206). The robot 10 continues to perform the alert mode operation until it is determined that the alert mode can be released (NO in step S208 and step S206), and releases the alert mode in a case in which it is determined that the alert mode can be released (YES in step S208 and step S210). Thereafter, the robot 10 returns to the normal mode operation.

Figure 7:
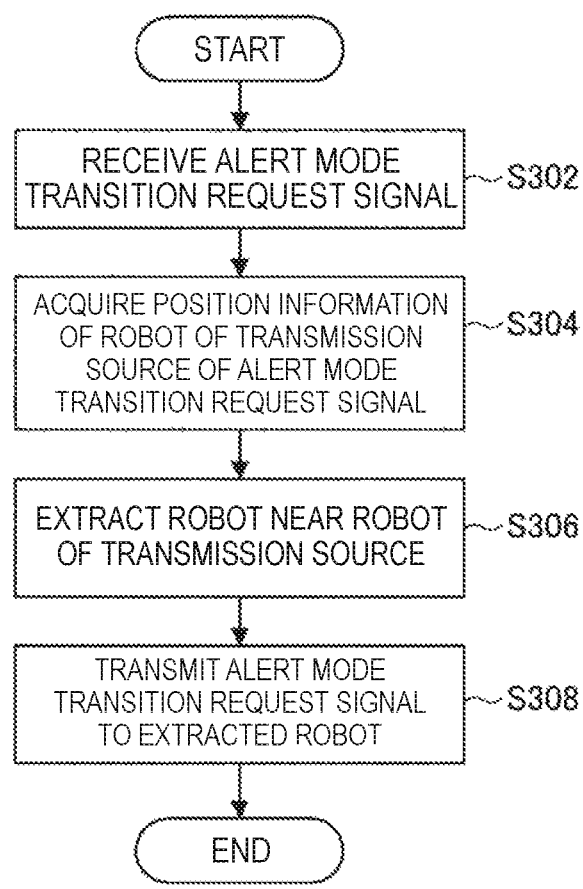
FIG. 7 is a flowchart illustrating an example of a flow of an alert mode transition request signal relay process executed in a server according to the present embodiment.

FIG. 7 is a flowchart illustrating an example of a flow of an alert mode transition request signal relay process executed in the server 60 according to the present embodiment. As illustrated in FIG. 7, first, the server 60 receives the alert mode transition request signal (step S302). Then, the server 60 acquires the position information of the robot 10 of the transmission source of the alert mode transition request signal (step S304). The position information may be included in the alert mode transition request signal, or the position information may be acquired with reference to the identification information of the robot 10 of the transmission source included in the alert mode transition request signal in the management DB. Then, the server 60 extracts the robots near the robot 10 of the transmission source with reference to the management DB (step S306). Then, the server 60 transmits the alert mode transition request signal to the extracted robots 10 (step S308).

<3.2. First Abnormal State>

A first abnormal state indicates that the robot 10 loses sight of the first monitoring target. First, an overview of the first abnormal state will be described with reference to FIG. 8.

Figure 8:
FIG. 8 is an explanatory diagram for describing a first abnormal state according to the present embodiment.

FIG. 8 is an explanatory diagram for describing the first abnormal state according to the present embodiment. As illustrated in FIG. 8, the robot 10A loses sight of the old man 20A who is the first monitoring target. There is another robot 10B near the robot 10A that regards a young man 20B as the first monitoring target. In this regard, the robot 10A searches for the old man 20A by itself, transmits the alert mode transition request signal to the robot 10B and requests the robot 10B to search for the old man 20A.

Technical features related to the first abnormal state will be described below.

The robot 10 determines that the first monitoring target is not within the monitorable range of the robot 10 as the abnormal state. For example, in a case in which a period during which the first monitoring target is not within a possible range exceeds a predetermined time or in a case in which a physical distance or a temporal distance from the first monitoring target exceeds a predetermined value, the robot 10 determines that the first monitoring target is in the abnormal state. Typically, the abnormal state occurs in a case in which the first monitoring target wanders or the like. For example, it may be recognized that the first monitoring target is not within the monitorable range when the robot 10 fails to receive a beacon periodically transmitted from the first monitoring target, when the reception strength falls below a predetermined value, or the like.

In this case, the transmitted alert mode transition request signal includes the identification information identifying the monitoring target determined not to be within the monitorable range. For example, the robot 10 of the transmission source transmits the identification information of the first monitoring target. The identification information may include the ID of the beacon transmitted from the first monitoring target, a face image of the first monitoring target, or the like. Then, the robot 10 of the transmission source transitions to the alert mode and searches for the first monitoring target. On the other hand, in the alert mode, the robot 10 of the reception destination searches for the second monitoring target indicated by the identification information included in the received alert mode transition request signal (here, the first monitoring target to the robot 10 of the transmission source).

Then, in a case in which the search is successfully performed, the robot 10 of the reception destination transmits information indicating a search success to another robot 10 which is the transmission source of the alert mode transition request signal. Here, the case in which the search is successfully performed means, for example, that the second monitoring target is within the monitorable range for a predetermined time or more. The information indicating the search success may include, for example, the position information of the robot 10 which is successfully searched for, and the robot 10 of the transmission source performs the search with reference to the position information. With feedback of the information indicating the search success, the robot 10 of the transmission source can move toward the first monitoring target earlier than when the search is performed by itself.

With the alert operation described above, the robot 10 of the transmission source can discover the old man earlier than when the search is performed by itself, for example, in a case in which the owner who is the old man wanders around. Of course, the first abnormal state can occur even in a situation in which the owner does not wander. For example, in a case in which a criminal is running away, the robot 10 may receive the alert mode transition request signal including identification information of the criminal from the police via the server 60 and search for the criminal. In this case, the robot 10 may transmit the alert mode transition request signal to the nearby robots each time the criminal is detected. Further, as the alert mode operation, the robot 10 may guide the first monitoring target to be away from the criminal. Further, for example, in a case in which a child gets lost in a commercial facility, the robot 10 in the commercial facility may receive the alert mode transition request signal including identification information of the child and search for the missing child.

In a case in which the alert mode release request occurs after the transition to the alert mode is performed, the robot 10 releases the alert mode and transitions to the normal mode. For example, in a case in which it is recognized that the monitoring target determined not to be within the monitorable range is found, the robot 10 releases the alert mode. Here, the recognizing that the monitoring target is found may means the robot 10 of the transmission source succeeds in searching or may mean that the robot 10 of the reception destination succeeds in searching. Further, in a case in which the robot 10 of the reception destination succeeds in searching, the robot 10 of the reception destination may protect until the handover of the transmission source of the search target to the robot 10 is completed. Then, the robot 10 of the transmission source and the reception destination may release the alert mode after the handover is completed. Here, the protecting refers to, for example continuing a state that the search target is included within the monitorable range of the robot 10 of the reception destination. Further, for example, the handover refers to the fact that the search target is included within the monitorable range of the robot 10 of the transmission source.

Flows of processes of the robots 10 of the transmission source and the reception destination regarding the first abnormal state will be described with reference to FIGS. 9 and 10.

Figure 9:
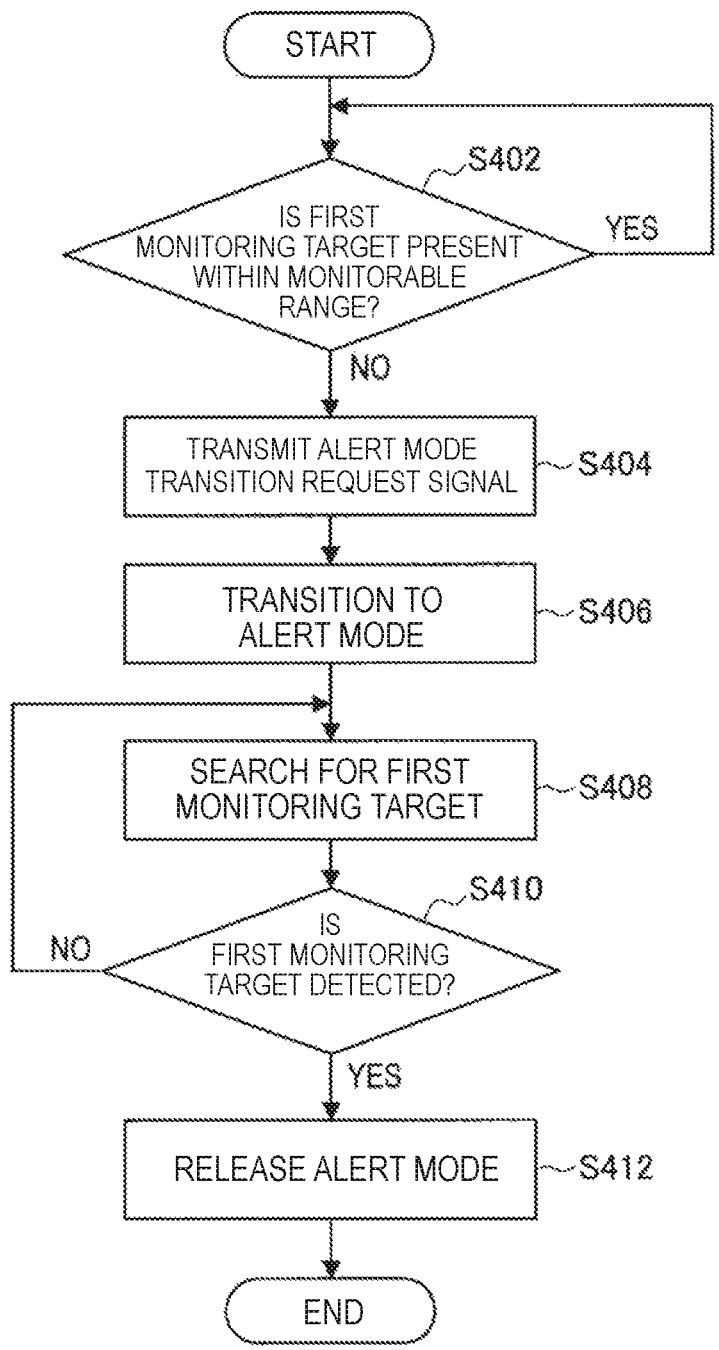
FIG. 9 is a flowchart illustrating an example of a flow of an alert mode transition process executed in a robot of a transmission source according to the present embodiment.

FIG. 9 is a flowchart illustrating an example of a flow of an alert mode transition process executed in the robot 10 of the transmission source according to the present embodiment. As illustrated in FIG. 9, the robot 10 first determines whether or not the first monitoring target is present within the monitorable range on the basis of the sensing data (step S402). In a case in which it is determined that the first monitoring target is present (YES in step S402), the robot 10 continues to perform the normal mode operation. In a case in which it is determined that the first monitoring target is not present (NO in step S402), the robot 10 transmits the alert mode transition request signal to other robots 10 (step S404), transitions to the alert mode (step S406), and searches for the first monitoring target (step S408). The robot 10 keeps searching for the first monitoring target until the first monitoring target is detected (NO in step S410), and releases the alert mode in a case in which the first monitoring target is detected (YES in step S410 and step S412).

Figure 10:
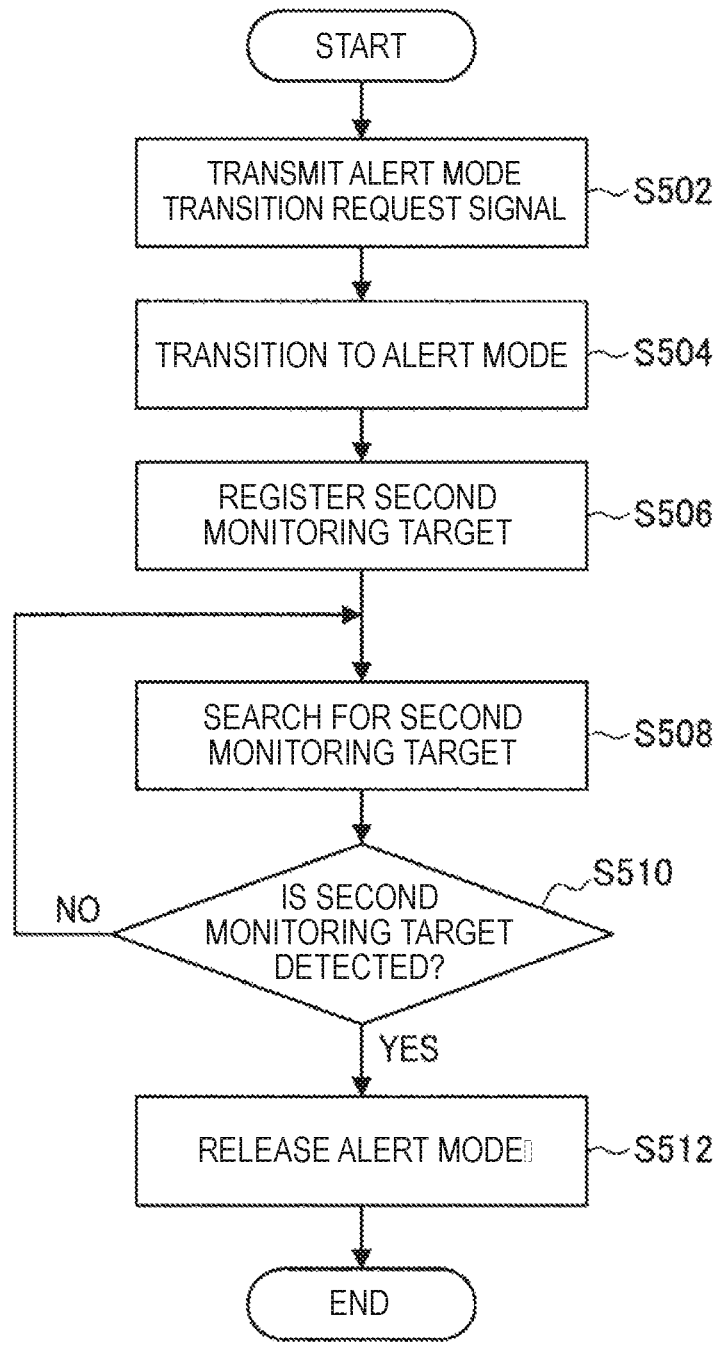
FIG. 10 is a flowchart illustrating an example of a flow of an alert mode transition process executed in a robot of a reception destination according to the present embodiment.

FIG. 10 is a flowchart illustrating an example of a flow of an alert mode transition process executed in the robot 10 of the reception destination according to the present embodiment. As illustrated in FIG. 10, in a case in which the robot 10 receives the alert mode transition request signal from another robot 10 (step S502), the robot 10 transitions to the alert mode (step S504). Then, the robot 10 registers the second monitoring target indicated by the identification information included in the alert mode transition request signal (step S506) and searches for the second monitoring target (step S508). The robot 10 continues to search for the second monitoring target until the second monitoring target is detected (NO in step S510) and releases the alert mode in a case in which the second monitoring target is detected (YES in step S510 and step S512).

<3.3. Response to Second Abnormal State>

A second abnormal state occurs while the robot 10 continues to monitor the first monitoring target. First, an overview of the second abnormal state will be described with reference to FIG. 11.

Figure 11:
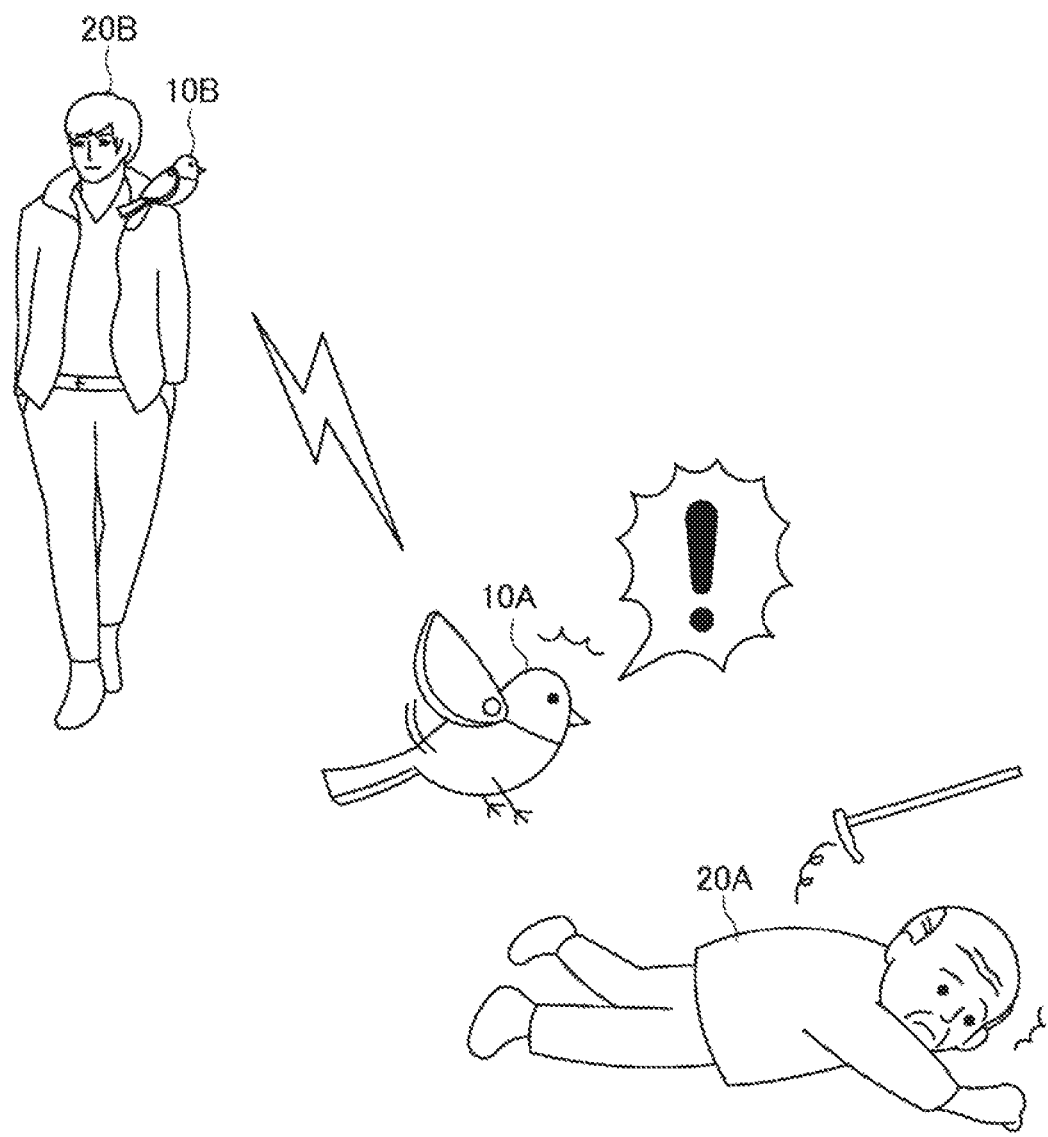
FIG. 11 is an explanatory diagram for describing a second abnormal state according to the present embodiment.

FIG. 11 is an explanatory diagram for describing the second abnormal state according to the present embodiment. As illustrated in FIG. 11, the old man 20A which is the first monitoring target of the robot 10A falls. Further, there is another robot 10B near the robot 10A that regards the young man 20B as the first monitoring target. In this regard, the robot 10A calls for help, for example, by issuing an alarm sound at full volume and notifying nearby persons of an abnormal situation, and requests the young man 20B to help the old man 20A by transmitting the alert mode transition request signal to the robot 10B.

Technical features related to the second abnormal state will be described below.

The robot 10 determines the abnormal state of the first monitoring target which is within the monitorable range of the robot 10. Here, the abnormal state refers to falls, injuries, illnesses, seizures, approaches of suspicious persons, and the like.

The robot 10 has a function of notifying nearby persons of the abnormal state of the first or second monitoring target.

For example, if it is determined that the first monitoring target is in the abnormal state on the basis of the sensing data, the robot 10 of the transmission source transitions to the alert mode and notifies the nearby persons of the abnormal state of the first monitoring target. Accordingly, the robot 10 can urge the nearby persons to help the first monitoring target.

On the other hand, if the alert mode transition request signal is received, the robot 10 of the reception destination transitions to the alert mode and notifies the first monitoring target of the information included in the received alert mode transition request signal. Here, the alert mode transition request signal includes information indicating the position information of another robot 10 of the transmission source and the abnormal state of the second monitoring target. Thus, the first monitoring target notices the abnormal state of the second monitoring target and can go and help the second monitoring target with reference to the position information. Of course, the first monitoring target may choose not to help although the first monitoring target notices the abnormal state of the second monitoring target. Further, the robot 10 of the reception destination may notify the nearby persons of the abnormal state of the second monitoring target. Accordingly, the robot 10 of the reception destination can prompt the nearby persons to help the second monitoring target, similarly to the robot 10 of the transmission source.

The robot 10 may recognize the occurrence of the alert mode release request on the basis of the fact that the abnormal state of the first monitoring target or the second monitoring target is resolved, the nearby person comes to help, or a manipulation by a person who comes to help and then release the alert mode.

With such an alert mode operation, for example, it is possible to get help from the nearby person promptly in a case in which the old man falls but does not get up when walking with the robot 10.

Flows of processes of the robots 10 of the transmission source and reception destination regarding the second abnormal state will be described with reference to FIGS. 12 and 13.

Figure 12:
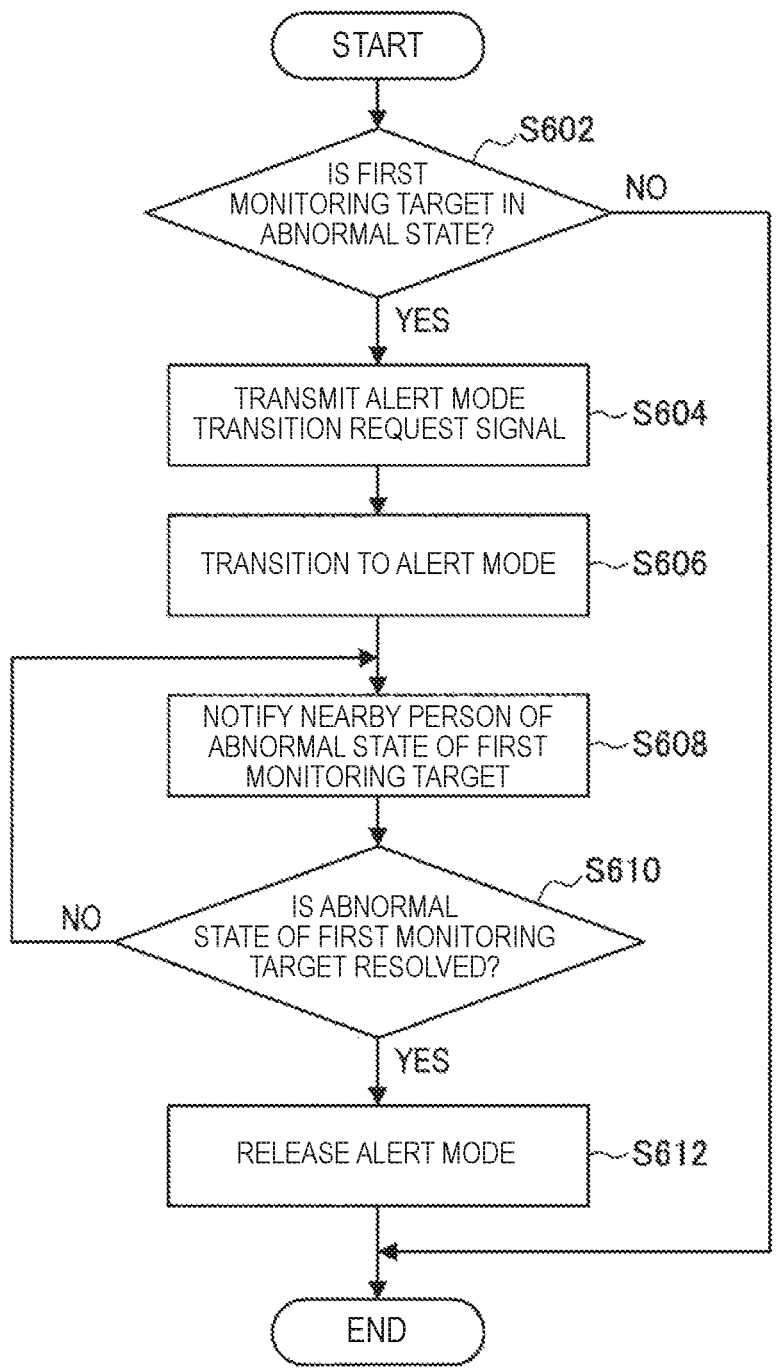
FIG. 12 is a flowchart illustrating an example of a flow of an alert mode transition process executed in a robot of a transmission source according to the present embodiment.

FIG. 12 is a flowchart illustrating an example of a flow of an alert mode transition process executed in the robot 10 of the transmission source according to the present embodiment. As illustrated in FIG. 12, the robot 10 first determines whether or not the first monitoring target is in the abnormal state on the basis of the sensing data (step S602). In a case in which it is determined that the first monitoring target is not in the abnormal state (NO in step S602), the robot 10 continues to perform the normal mode operation. In a case in which it is determined that the first monitoring target is not in the abnormal state (YES in step S602), the robot 10 transmits the alert mode transition request signal to another robot 10 (step S604) and transitions to the alert mode (step S606). Then, the robot 10 notifies the nearby person of the abnormal state of the first monitoring target (step S608). The robot 10 continues to give the notification until it is recognized that the abnormal state of the first monitoring target is resolved (NO in step S610) and releases the alert mode in a case in which it is recognized that the abnormal state of the first monitoring target is resolved (YES in step S610 and step S612).

Figure 13:
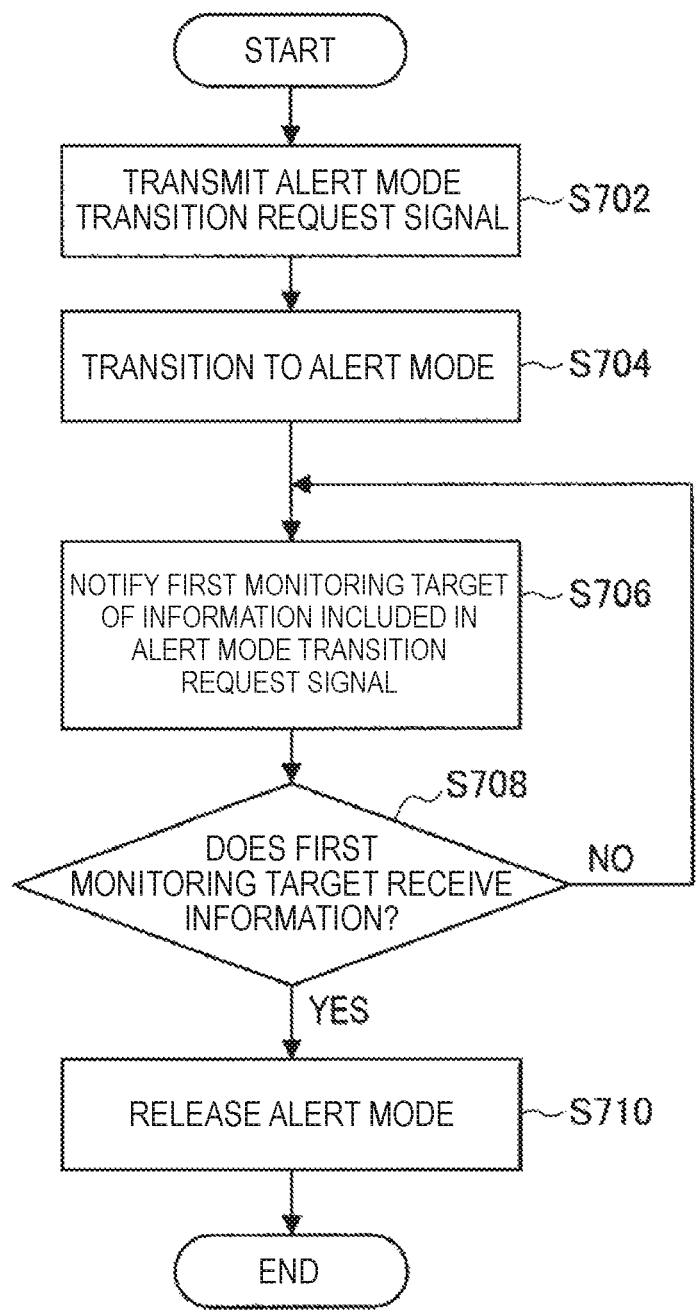
FIG. 13 is a flowchart illustrating an example of a flow of an alert mode transition process executed in a robot of a reception destination according to the present embodiment.

FIG. 13 is a flowchart illustrating an example of a flow of an alert mode transition process executed in the robot 10 of the reception destination according to the present embodiment. As illustrated in FIG. 13, firstly, in a case in which the alert mode transition request signal is received from another robot 10 (step S702), the robot 10 transitions to the alert mode (step S704). Then, the robot 10 notifies the first monitoring target of the information included in the alert mode transition request signal (step S706). The robot 10 continues to give the notification until it is recognized that the first monitoring target receives the information (NO in step S708) and releases the alert mode in a case in which it is recognized that the first monitoring target receives the information (YES in step S708 and step S710).

Here, a case in which the first monitoring target is a child is assumed. An overview of the second abnormal state which can occur in this case will be described with reference to FIG. 14.

Figure 14:
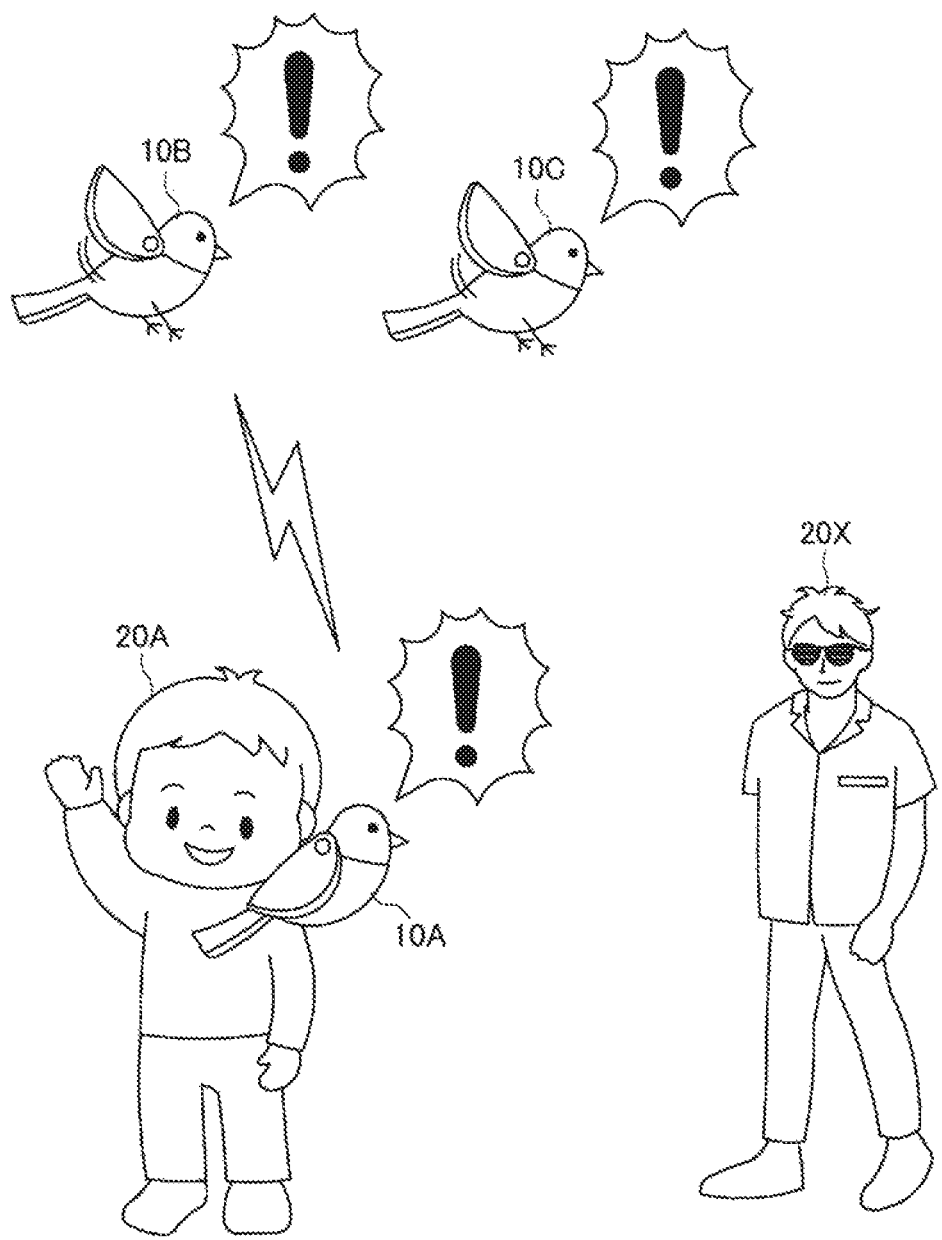
FIG. 14 is an explanatory diagram for describing a second abnormal state according to the present embodiment.

FIG. 14 is an explanatory diagram for describing the second abnormal state according to the present embodiment. As illustrated in FIG. 14, a suspicious person 20X approaches the child 20A who is the first monitoring target of the robot 10A. In this regard, for example, the robot 10A calls for help by notifying the nearby person of the abnormal state in which the suspicious person is approaching, for example, by issuing a warning sound at full volume, and calls for help by transmitting the alert mode transition request signal to the nearby robots 10B and 10C. In this case, the robots 10B and 10C gather around the robot 10A and drives the suspicious person 20X out, for example, by emitting a warning sound at full volume.

First, the technical features in a case in which the first monitoring target is a child will be described below in connection with the robot 10 of the transmission source.

In a case in which the child who is the first monitoring target is playing in a park or the like without being accompanied by a parent, the robot 10 plays a role of protecting and watching the child and detects the abnormal state on the basis of various sensing data. For example, the robot 10 detects a suspicious adult by detecting that there is a tall adult near the first monitoring target using a laser range finder or that a name of the first monitoring target is called by a stranger using a microphone. In a case in which such an abnormal state is detected, the robot 10 transmits the alert mode transition request signal. In addition, the robot 10 can call attention to the suspicious person by giving a warning notice to the first monitoring target. In addition, the robot 10 can also disturb the suspicious person by giving a warning notice to the surroundings.

The robot 10 may recognize the occurrence of the alert mode release request on the basis of the fact that the abnormal state of the first monitoring target is resolved, the nearby person comes to help, or a manipulation from the first monitoring target and then release the alert mode.

Next, the robot 10 of the reception destination will be described.

The robot 10 of the reception destination may give a warning notice to the surrounding in the alert mode. Further, in the alert mode, the robot 10 which has received the alert mode transition request signal may search for the robot 10 of the transmission source of the alert mode transition request signal (that is, another robot 10) in addition to the above notice. Then, the robot 10 continues to give the notification even after finding the robot 10 of the transmission source. Accordingly, other robot 10 which have received the alert mode transition request signal may gather together around the robot 10 of the transmission source and drive the suspicious person out by giving the warning notice to the surroundings, for example, by turning on and off a rotary beacon light in a group and emitting a warning sound at full volume.

However, the robot 10 of the reception destination may continue to monitor the first monitoring target. This is because the monitoring of the first monitoring target by itself is given a priority except in a case in which it transitions to a group monitoring mode to be described later. This is noticeable in a case in which the first monitoring target is a child. In this regard, the robot 10 of the reception destination attempts to move together by giving a notification indicating that the robot 10 of the transmission source is searched for, that is, it is directed toward a place in which an abnormality occurs to the first monitoring target. Accordingly, the robot 10 can search for the robot 10 of the transmission source without leaving the first monitoring target behind.

The robot 10 may recognize the occurrence of the alert mode release request on the basis of the fact that the abnormal state of the second monitoring target is resolved or the manipulation from the first monitoring target and release the alert mode. Further, the fact that the abnormal state of the second monitoring target is resolved can be recognized by receiving a signal from the robot 10 of the transmission source which has released the alert mode.

Hereinafter, flows of processes of the robots 10 of the transmission source and the reception destination will be described with reference to FIGS. 15 and 16.

Figure 15:
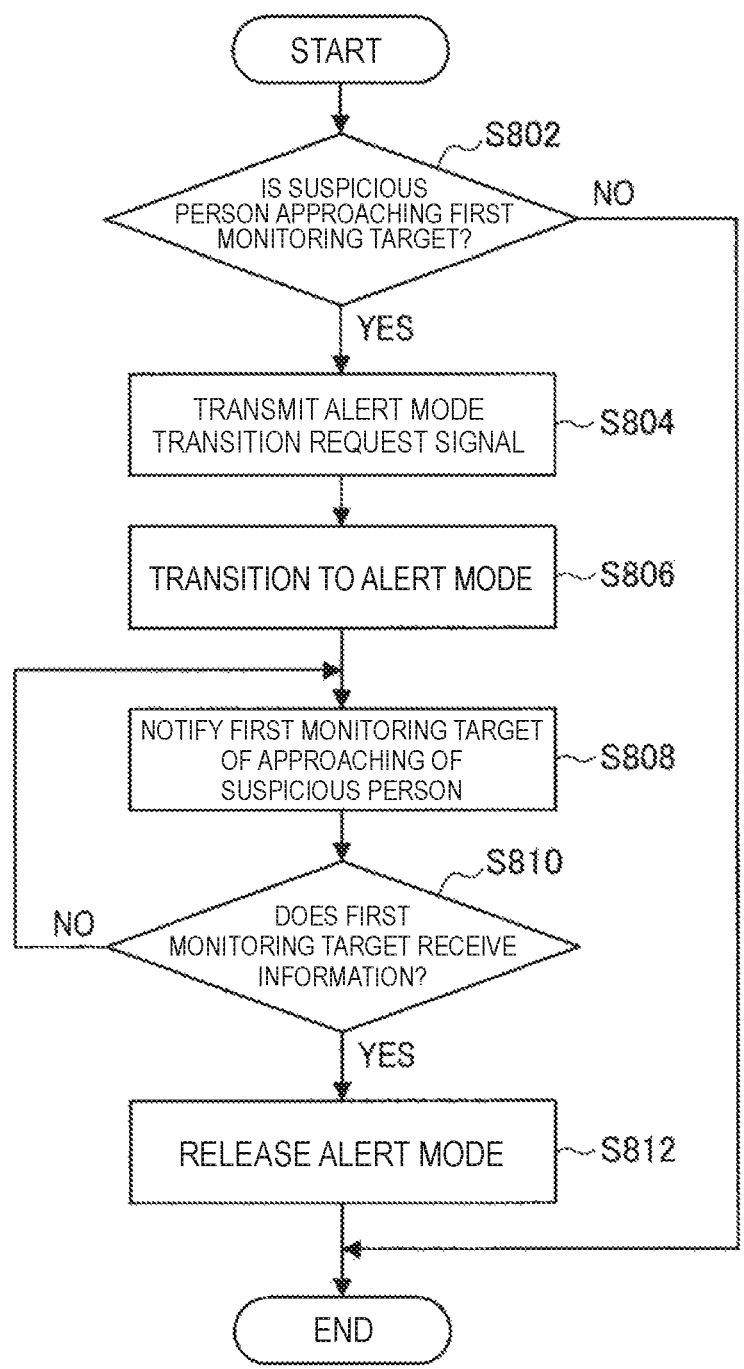
FIG. 15 is a flowchart illustrating an example of a flow of an alert mode transition process executed in a robot of a transmission source according to the present embodiment.

FIG. 15 is a flowchart illustrating an example of a flow of an alert mode transition process executed in the robot 10 of the transmission source according to the present embodiment. As illustrated in FIG. 15, first, the robot 10 determines whether or not a suspicious person is approaching the first monitoring target on the basis of the sensing data (step S802). In a case in which it is determined that the suspicious person is not approaching (NO in step S802), the robot 10 continues to perform the normal mode operation. In a case in which it is determined that the suspicious person is approaching (YES in step S802), the robot 10 transmits the alert mode transition request signal to another robot 10 (step S804), and transitions to the alert mode (step S806). Then, the robot 10 notifies the first monitoring target of the approaching of the suspicious person (step S808). The robot 10 continues to give the notification until it is recognized that the first monitoring target receives the information (NO in step S810) and releases the alert mode in a case in which it is recognized that the first monitoring target receives the information (YES in step S810 and step S812).

Figure 16:
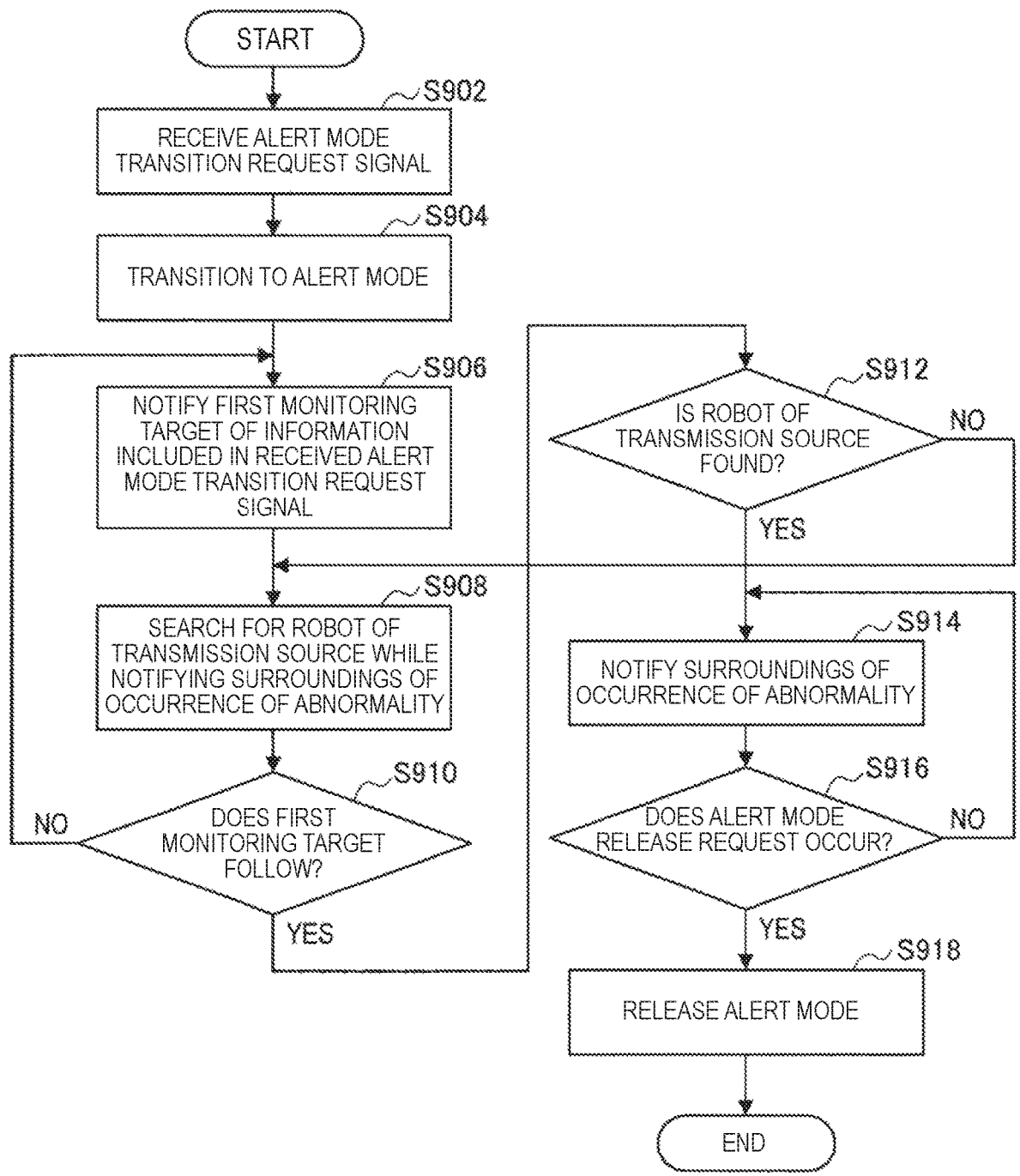
FIG. 16 is a flowchart illustrating an example of a flow of an alert mode transition process executed in a robot of a reception destination according to the present embodiment.

FIG. 16 is a flowchart illustrating an example of a flow of an alert mode transition process executed in the robot 10 of the reception destination according to the present embodiment. As illustrated in FIG. 16, first, if the alert mode transition request signal is received from another robot 10 (step S902), the robot 10 transitions to the alert mode (step S904). Then, the robot 10 notifies the first monitoring target of the information included in the alert mode transition request signal (step S906) and searches for the robot 10 of the transmission source while notifying the surroundings of the occurrence of the abnormality (step S908). In a case in which the first monitoring target does not follow itself, the robot 10 gives a notification again (NO in step S910), and in a case in which the first monitoring target follows, the robot 10 continues to search for until the robot 10 of the transmission source is found (YES in step S910 and NO in step S912). In a case in which the robot 10 of the transmission source is found, the robot 10 notifies the surroundings of the occurrence of the abnormality near the robot 10 of the transmission source (YES in step S912 and step S914). The robot 10 continues to give the notification until the alert mode release request occurs (NO in step S916), and releases the alert mode in a case in which the alert mode release request occurs (YES in step S916 and step S918). For example, the alert mode release request is transmitted from the robot 10 of the transmission source.

<3.4. Group Monitoring Mode>

The monitoring of the first monitoring target may be performed in cooperation with another robot 10. The operation mode of monitoring in cooperation with another robot 10 is also referred to as a group monitoring mode. First, an overview of the group monitoring mode will be described with reference to FIG. 17.

Figure 17:
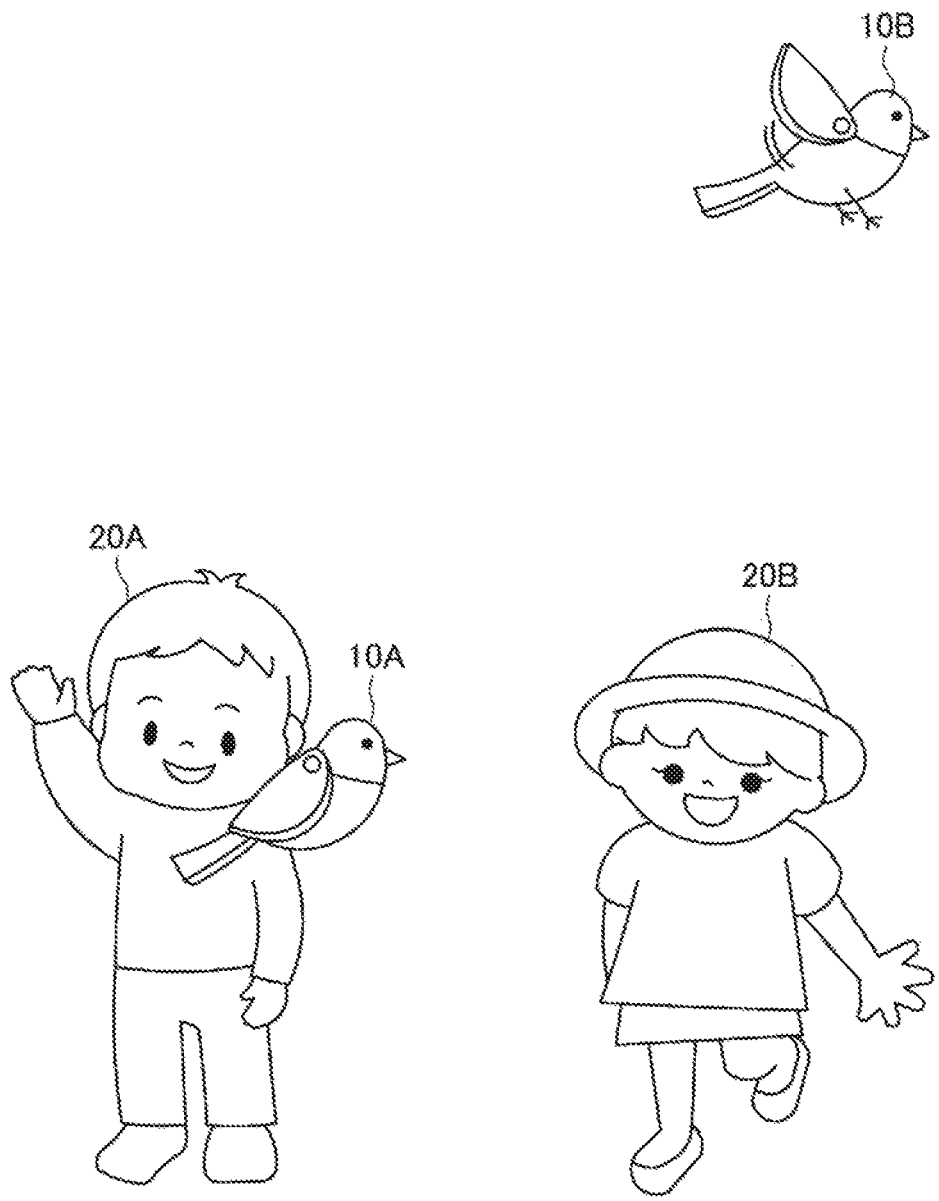
FIG. 17 is an explanatory diagram for describing a group monitoring mode according to the present embodiment.

FIG. 17 is an explanatory diagram for describing the group monitoring mode according to the present embodiment. The robot 10A regards the child 20A as the first monitoring target and the robot 10B regards the child 20B as the first monitoring target. If the robots 10A and 10B transition to the group monitoring mode, the robots 10A and 10B monitor both the children 20A and 20B together. Further, as illustrated in FIG. 17, while the robot 10A monitors the children 20A and 20B, the robot 10B can freely operate without monitoring the child 20B as well.

Technical features related to the group monitoring mode will be described below.

If a specific monitoring target associated with the first monitoring target is identified on the basis of the sensing data, the robot 10 transitions to the group monitoring mode in which the specific monitoring target is set as the monitoring target along with the first monitoring target. The specific monitoring target is a person associated with the first monitoring target such as, for example, an acquaintance or a friend of the first monitoring target among the second monitoring targets. For example, the robot 10 learns the specific monitoring target in accordance with a determination criterion such as a criterion in which the frequency of acting with the first monitoring target is high or a criterion in which biological information of the first monitoring target while acting together indicates a relaxed state. Further, the robot 10 may learn another robot 10 that regards the specific monitoring target as the first monitoring target. Accordingly, the robots 10 that can transition to the group monitoring mode can be grouped together and cooperate with one another within the group. Further, here, the learning refers to storing the identification information of the specific monitoring target or the identification information of another robot 10 belonging to the group so that it is identifiable.

A plurality of robots 10 that have transitioned to the group monitoring mode monitor the first monitoring targets of the other robots 10 as the specific monitoring target. In other words, one monitoring target is monitored from a plurality of the robots 10. If it is considered that the sensors, the monitoring positions, or the like of the robots 10 can be different, it is possible to improve a probability of detection of the abnormal state by monitoring one monitoring target by a plurality of the robots 10.

Further, the robot 10 that has transitioned to the group monitoring mode may transmit a group monitoring mode transition request signal for requesting the transition to the group monitoring mode to the robot 10 that regards the specific monitoring target as the first monitoring target. Accordingly, it is possible to cause the robot 10 that regards the specific monitoring target as the first monitoring target to transition to the group monitoring mode promptly. Of course, the robot 10 to which the group monitoring mode transition request signal is transmit may have already transitioned to the group monitoring mode before it is received.

Further, the robot 10 that has transitioned to the group monitoring mode may delegate the monitoring of the first monitoring target to another robot 10 that has similarly transitioned to the group monitoring mode. Accordingly, it is possible to reduce the burden on the robot 10 on the delegated side. Further, a degree of freedom of the operation of the robot 10 on the delegated side is greatly improved. For example, in a case in which the robot 10 receives the alert mode transition request signal and transitions to the alert mode, the robot 10 can perform the alert mode operation with a higher degree of freedom by delegating the monitoring of the first monitoring target to another the robot 10.

For example, the robot 10 may perform charging in a case in which another robot 10 that monitors the specific monitoring target also transitions to the group monitoring mode in which the first monitoring target is monitored. Accordingly, the robot 10 can perform charging while securing the safety of the first monitoring target. In addition to the charging, the robot 10 may take a rest, for example, may receive maintenance. Here, the robot 10 on the delegating side may charge another robot 10 belonging to the group after obtaining a charging permission. This is because the monitoring burden of another robot 10 belonging to the group increases. For example, the charging permission may be obtained in a case in which the first monitoring target and the specific monitoring target are included in the monitorable range of another robot 10 belonging to the group.

Further, for example, in a case in which another robot 10 that monitors the specific monitoring target also transitions to the group monitoring mode in which the first monitoring target is monitored, the robot 10 releases the condition that the first monitoring target is within the monitorable range of the robot 10 and then move. Accordingly, the robot 10 can search for the second monitoring target, for example, at a place far from the first monitoring target.

Figure 18:
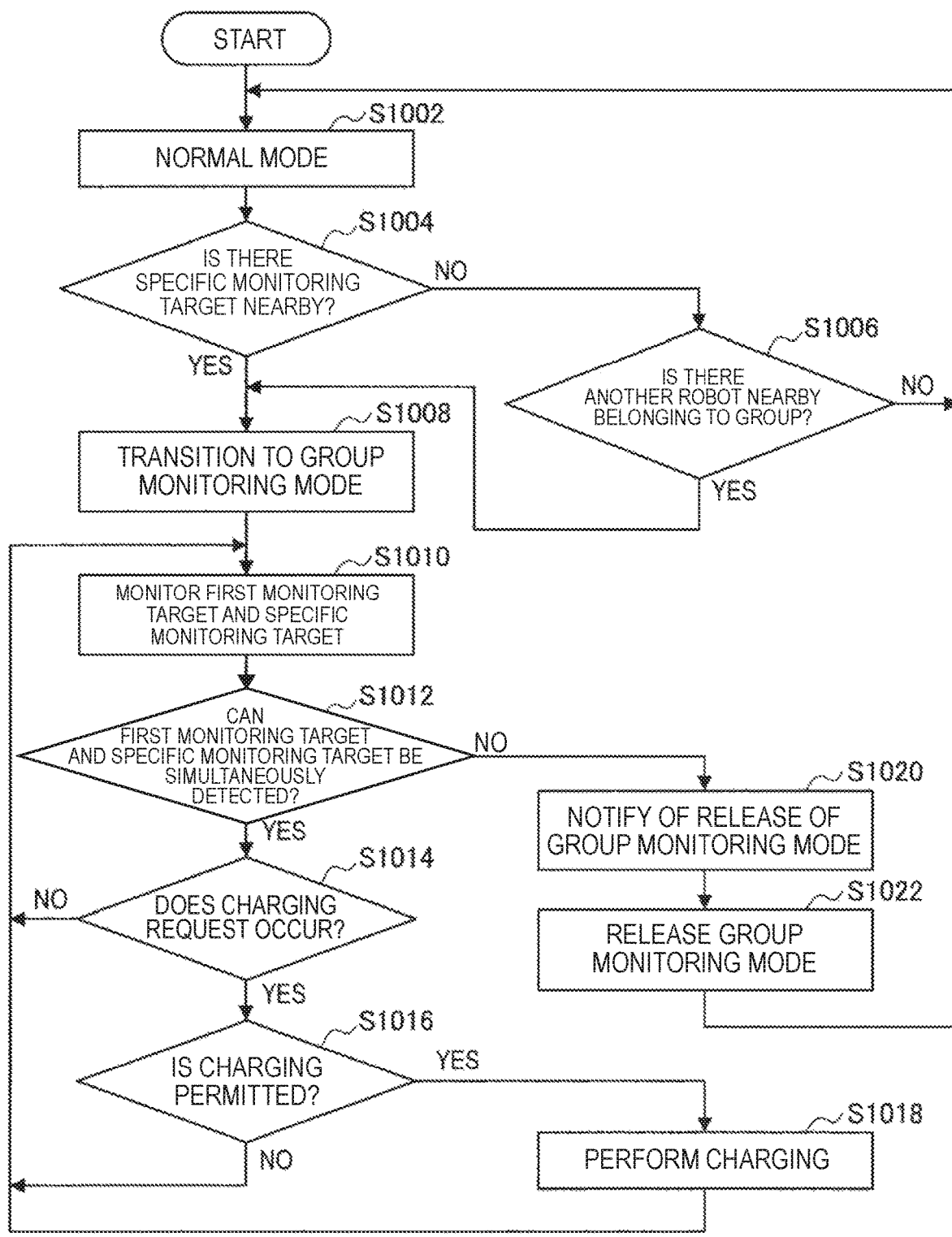
FIG. 18 is a flowchart illustrating an example of a flow of a group monitoring mode transition process executed in a robot according to the present embodiment.

FIG. 18 is a flowchart illustrating an example of a flow of a group monitoring mode transition process executed in the robot 10 according to the present embodiment. As illustrated in FIG. 18, first, the robot 10 operates in the normal mode and monitors the first monitoring target (step S1002). During that time, the robot 10 determines whether or not there is a specific monitoring target near itself and whether or not there is another robot 10 belonging to the group near itself (steps S1004 and S1006), and while NO is determined in two steps, the robot 10 continues to perform the operation in the normal mode (NO in step S1004 and NO in S1006). In a case in which it is determined that there is a specific monitoring target or another robot 10 belonging to the group near itself (YES in step S1004 or YES in S1006), the robot 10 transitions to the group monitoring mode (step S1008), and monitors the first monitoring target and specific monitoring target (step S1010). Then, the robot 10 determines whether or not the first monitoring target and the specific monitoring target can be simultaneously detected on the basis of the sensing data (step S1012). In a case in which the first monitoring target and the specific monitoring target can be simultaneously detected (YES in step S1016), a charging request occurs, for example, when the battery level is below a threshold value (YES in step S1014), and in a case in which the charging is permitted (YES in step S1016) and the robot 10 performs charging (step S1018). After charging, the robot 10 monitors the first monitoring target and the specific monitoring target (step S1010). Further, although the first monitoring target and the specific monitoring target can be simultaneously detected (YES in step S1012), in a case in which the charging request does not occur (NO in step S1014) or in a case in which the charging is not permitted (NO in step S1016), the robot 10 monitors the first monitoring target and the specific monitoring target (step S1010). On the other hand, in a case in which it is determined that the first monitoring target and the specific monitoring target are unable to be simultaneously detected (NO in step S1012), the robot 10 gives a notification indicating the release of the group monitoring mode to the first monitoring target (step S1020), releases the group monitoring mode (step S1022), and returns to the normal mode (step S1002).

<3.5. Consideration of First Monitoring Target>

The robot 10 controls whether or not the transition to the alert mode according to the received alert mode transition request signal is performed in accordance with the state of the first monitoring target recognized on the basis of the sensing data. Accordingly, even when the robot 10 receives the alert mode transition request signal, it is possible to give a priority to the monitoring of the first monitoring target over the monitoring or the search of the second monitoring target. Further, the robot 10 may control content of the alert mode operation in a case in which the transition to the alert mode is performed in addition to whether or not the transition to the alert mode is performed. Accordingly, the robot 10 can perform an appropriate alert mode operation according to the state of the first monitoring target, for example, such that it operates quietly in a case in which the user desires a quiet environment.

For example, the robot 10 controls whether or not the transition to the alert mode according to the received alert mode transition request signal is performed in accordance with a recognized emotion of the first monitoring target. Specifically, the robot 10 transitions to the alert mode in a case in which the emotion of the first monitoring target is stable, and does not transition to the alert mode or releases the alert mode even after the transition to the alert mode is performed in a case in which the emotion of the first monitoring target is unstable. Accordingly, in a case in which the emotion of the first monitoring target is unstable, the robot 10 can give a priority to the monitoring of the first monitoring target.

The robot 10 controls whether or not the transition to the alert mode according to the received alert mode transition request signal is performed depending on whether or not the first monitoring target is in a sleep state. Specifically, the robot 10 transitions to the alert mode in a case in which the first monitoring target is in the sleep state, and does not transition to the alert mode or releases the alert mode even after the transition to the alert mode is performed in a case in which the first monitoring target is in an awake state. Accordingly, the robot 10 can transition to the alert mode only during a period in which there is no risk of wandering or the like in the first monitoring target, and constant monitoring is unnecessary.

In addition, the robot 10 controls whether or not the transition to the alert mode according to the received alert mode transition request signal is performed in accordance with attribute information such as, for example, a physique and a sex of the first monitoring target, and/or content of the alert mode operation in a case in which the transition to the alert mode is performed. Accordingly, for example, the robot 10 can compare the physique of the first monitoring target with the physique of the suspicious person, preferentially transition to the alert mode with respect to the suspicious person having a larger physique than the first monitoring target, and give a notification indicating an abnormality to the surroundings with a loud sound.

An example of a flow of a process in which the first monitoring target by the robot 10 of the reception destination is considered will be described below.

Figure 19:
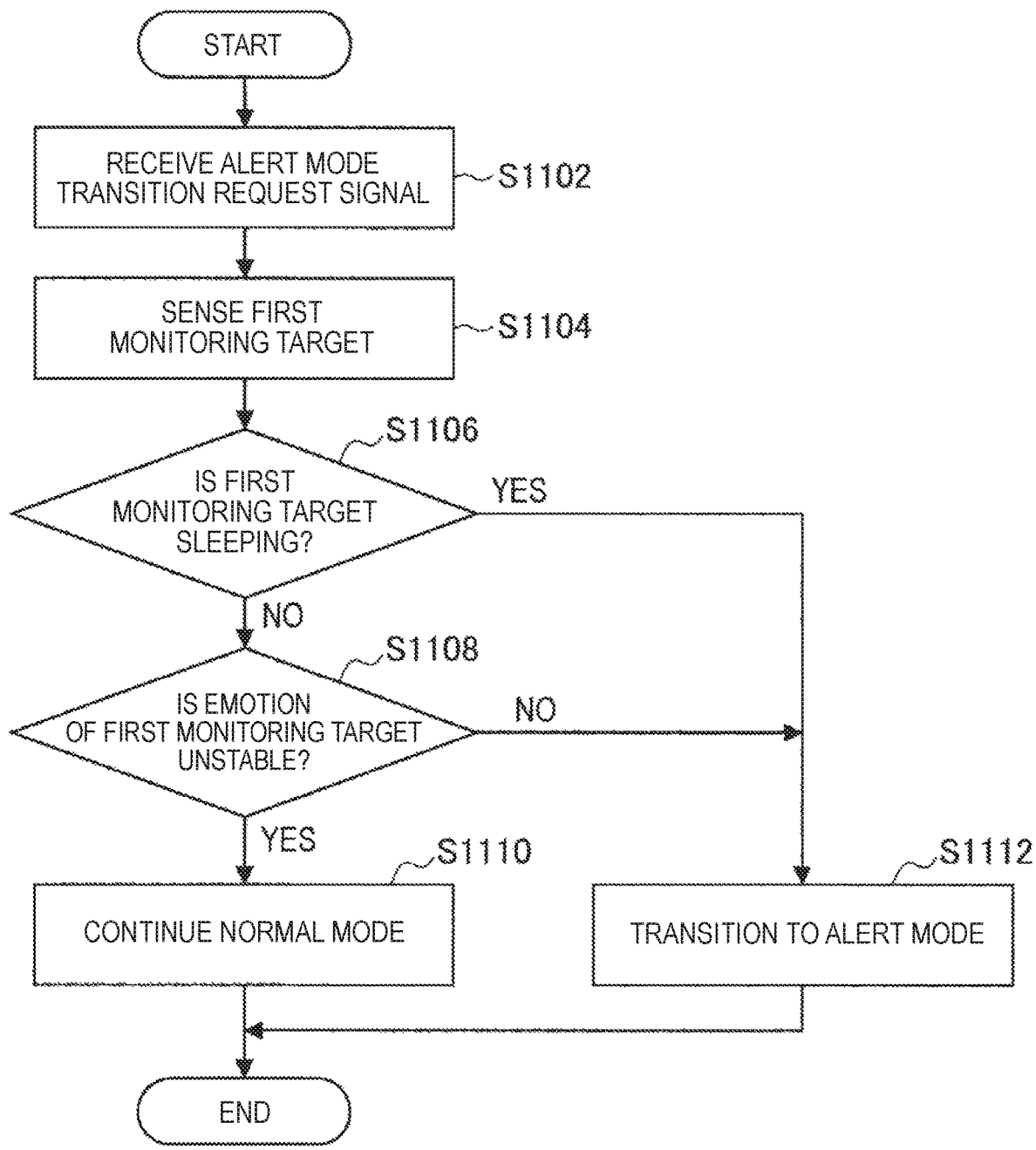
FIG. 19 is a flowchart illustrating an example of a flow of a mode transition process executed in a robot of a reception destination according to the present embodiment.

FIG. 19 is a flowchart illustrating an example of a flow of a mode transition process executed in the robot 10 of the reception destination according to the present embodiment. As illustrated in FIG. 19, the robot 10 first receives the alert mode transition request signal (step S1102). Then, the robot 10 senses the first monitoring target (step S1104), and determines whether or not the first monitoring target is sleeping on the basis of the sensing data (step S1106) and whether or not the emotion of the first monitoring target is unstable (step S1108). In a case in which the first monitoring target is not sleeping and it is determined that the emotion is unstable (NO in step S1106 and YES in S1108), the robot 10 continues the normal mode (step S1110). On the other hand, in a case in which it is determined that the first monitoring target is sleeping or the emotion is stable (YES in step S1106 or NO in S1108), the robot 10 transitions to the alert mode (step S1112).

Figure 20:
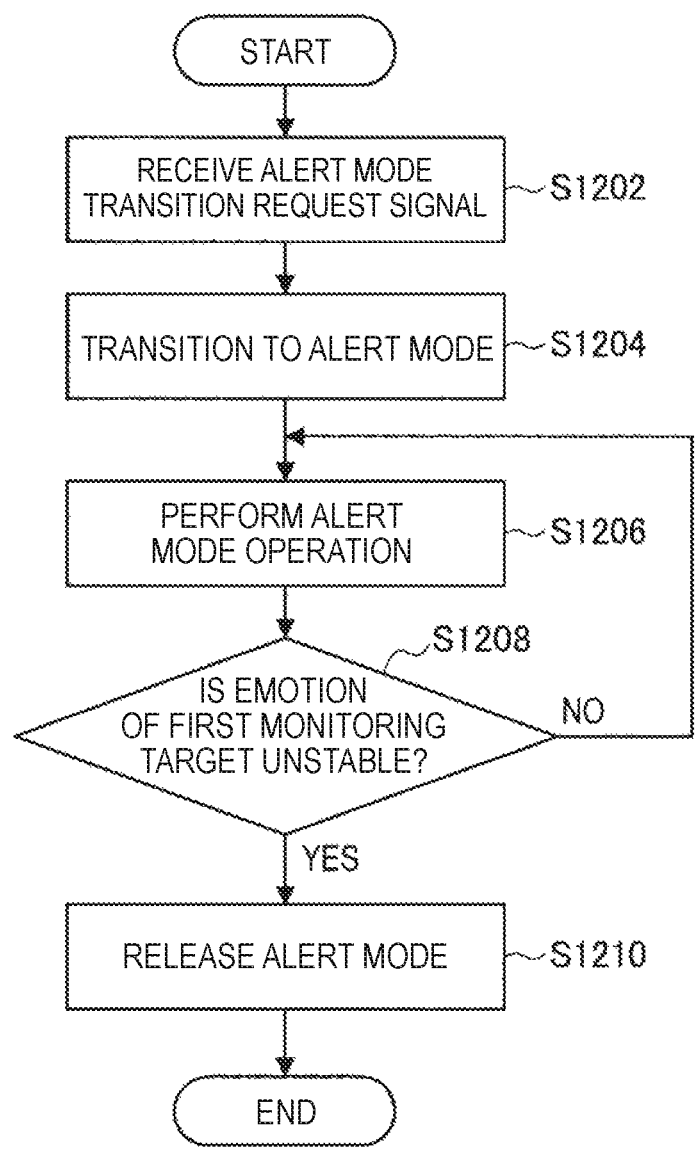
FIG. 20 is a flowchart illustrating an example of a flow of a mode transition determination process executed in a robot of a reception destination according to the present embodiment.

FIG. 20 is a flowchart illustrating an example of a flow of a mode transition determination process executed in the robot 10 of the reception destination according to the present embodiment. As illustrated in FIG. 20, the robot 10 first receives the alert mode transition request signal (step S1202). Then, the robot 10 transitions to the alert mode (step S1204) and performs the alert mode operation (step S1206). The robot 10 periodically determines whether or not the emotion of the first monitoring target is unstable (step S1208), and continues to perform the alert operation in a period that the emotion is determined to be stable (NO in step S1208). On the other hand, in a case in which the emotion is determined to be unstable (YES in step S1208), the robot 10 releases the alert mode (step S1210).

<3.6. Transfer of Alert Mode Transition Request Signal>

The robot 10 of the reception destination serves as a robot 10 of a transfer source and can transfer the alert mode transition request signal. Hereinafter, the robot 10 serving as the transfer source among the robots 10 of the reception destination is referred to as the robot 10 of the transfer source. First, an overview of the transfer of the alert mode transition request signal will be described with reference to FIG. 21.

Figure 21:
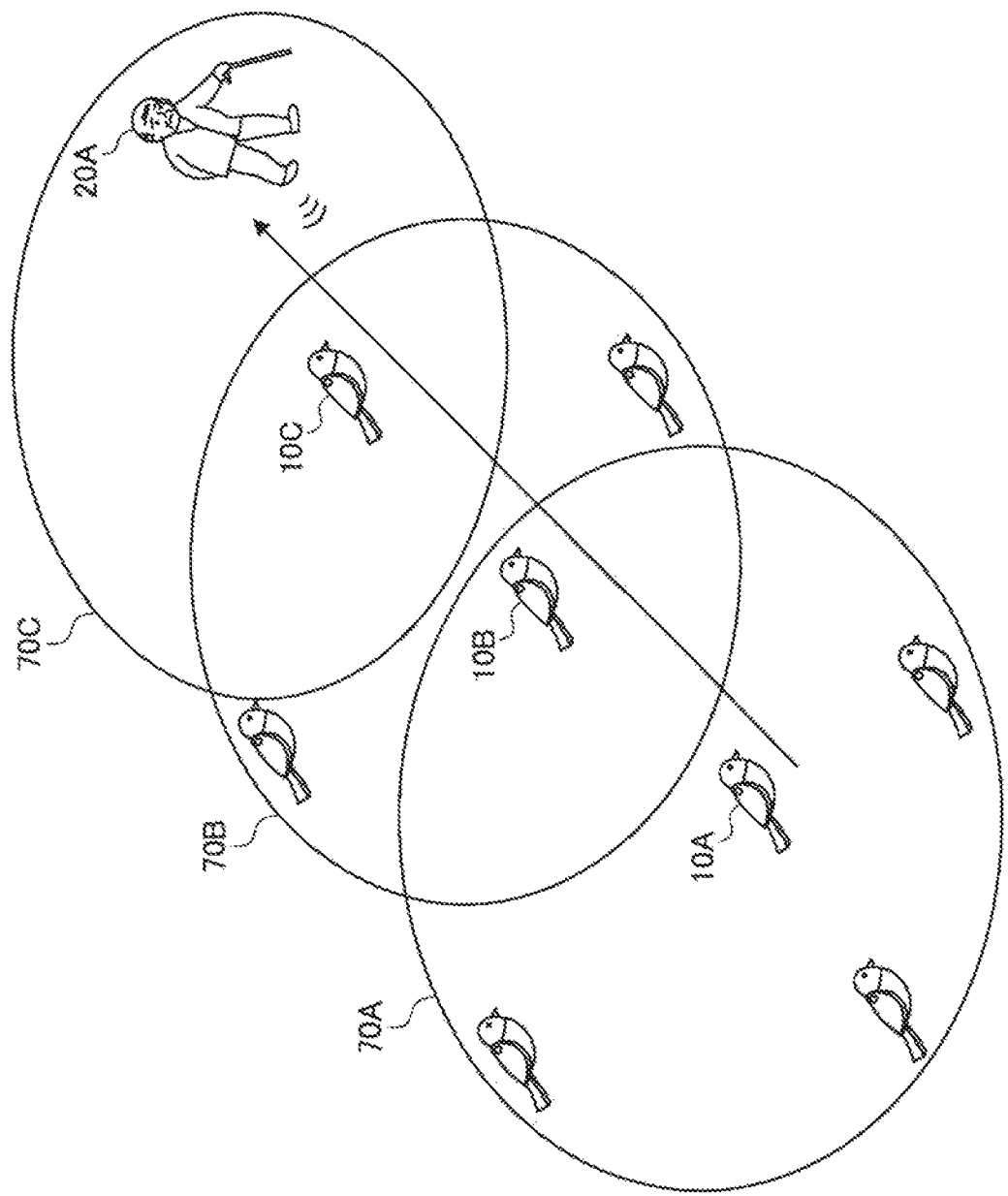
FIG. 21 is an explanatory diagram for describing transfer of an alert mode transition request signal according to the present embodiment.

FIG. 21 is an explanatory diagram for describing the transfer of the alert mode transition request signal according to the present embodiment. In the example illustrated in FIG. 21, the robot 10A regards the old man 20A as the first monitoring target. In a case in which the robot 10A loses sight of the old man 20A, the robot 10A transmits the alert mode transition request signal to other robots 10 in a surrounding range 70A. The robot 10B which has received the alert mode transition request signal serves as the transfer source in a case in which it has succeeded in searching for the old man 20A once but loses sight of the old man 20A, and transfers the alert mode transition request signal to other robots 10 in a surrounding range 70B. Similarly, the robot 10C that has received the alert mode transition request signal also serves as the transfer source in a case in which it has succeeded in searching for old man 20A once and but loses sight of the old man 20A, and transfers the alert mode transition request signal to other robots 10 in a surrounding range 70C. With such a transfer, it is possible to enlarge the receivable range of the alert mode transition request signal in a chain-like manner and cause more robots 10 to perform the alert operation.

Technical features related to the transfer of the alert mode transition request signal will be described below.

The robot 10 of the reception destination serves as the transfer source if necessary and transfers the alert mode transition request signal. For example, in a case in which the robot 10 which has received the alert mode transition request signal and transitioned to the alert mode has succeeded in searching for the second monitoring target once but loses sight of the second monitoring target, the robot 10 transmits the alert mode transition request signal including the identification information of the second monitoring target to another nearby robot 10. A case in which the robot 10 has succeeded in searching for the second monitoring target once but loses sight of the second monitoring target refers to, for example, a case in which the second monitoring target stays within the monitorable range for less than a predetermined period of time and then does not stay within the monitorable range. With such a transfer process, the alert mode transition request signal is transferred along a movement path of the search target, and thus it is possible to suppress an excessive increase in the number of robots 10 transitioning to the alert operation. On the other hand, in a case in which the robot 10 which has received alert mode transition request signal and transitioned to the alert mode continues to monitor without losing sight after successfully searching the second monitoring target, the robot 10 transmits information indicating the search success to the robot 10 of transmission source. Such information may reach the robot 10 of the transmission source via a transfer in a direction opposite to the transfer of the alert mode transition request signal. The information indicating the search success may include the position information of the robot 10 which is successfully searched for, and the robot 10 of the transmission source performs the search with reference to the position information. With such a transfer process, the robot 10 of the transmission source can protect the first monitoring target promptly.

The robots 10 of the transfer source and a non-transferred reception destination recognize that the robot 10 of the transmission source of the alert mode transition request signal has succeeded in searching for the second monitoring target (the first monitoring target to the robot 10 of the transmission source) and then ends the alert mode. For example, the robots 10 of the transfer source and the non-transferred reception destination release the alert mode in a case in which a signal for requesting the release of the alert mode is received from the robot 10A of the transmission source of the alert mode transition request signal. Further, the robot 10 of the non-transferred reception destination which has succeeded in searching may protect until the handover of the search target to the robot 10 of the transmission source is completed. Then, the robot 10 of the transmission source and the non-transferred reception destination may release the alert mode after the handover is completed. In addition, the robots 10 of the transfer source and the reception destination may release the alert mode on the basis of the fact that the first monitoring target thereof helps the second monitoring target.

The alert mode transition request signal may include various information. For example, the alert mode transition request signal includes identification information of the search target. The robot 10 of the reception destination can search for the search target on the basis of this identification information. Further, the alert mode transition request signal may include information indicating a transfer permission flag, an expiration date, and a valid geographical range. The robot 10 of the reception destination performs the transfer only in a case in which the transfer is permitted, the current time is within the expiration date, and a current location is within the valid geographical range. With such information, it is possible to prevent the alert mode transition request signal from being transferred to a too wide range. Since the alert mode transition request signal is mainly used when a wandering person or a missing child is searched or when an abnormality occurs, a wide notification range is not assumed. For example, it is important to find a wandering person or a missing child before they go far, and when the abnormality occurs, a response thereto should be performed immediately. In this regard, the robot 10 of the transmission source can set information for suppressing the transfer to the wide range.

Further, the received alert mode transition request signal and the transferred alert mode transition request signal may be identical or different. In the latter case, for example, the transferred alert mode transition request signal may include the position information of the robot 10 of the transfer source or the like.

Figure 22:
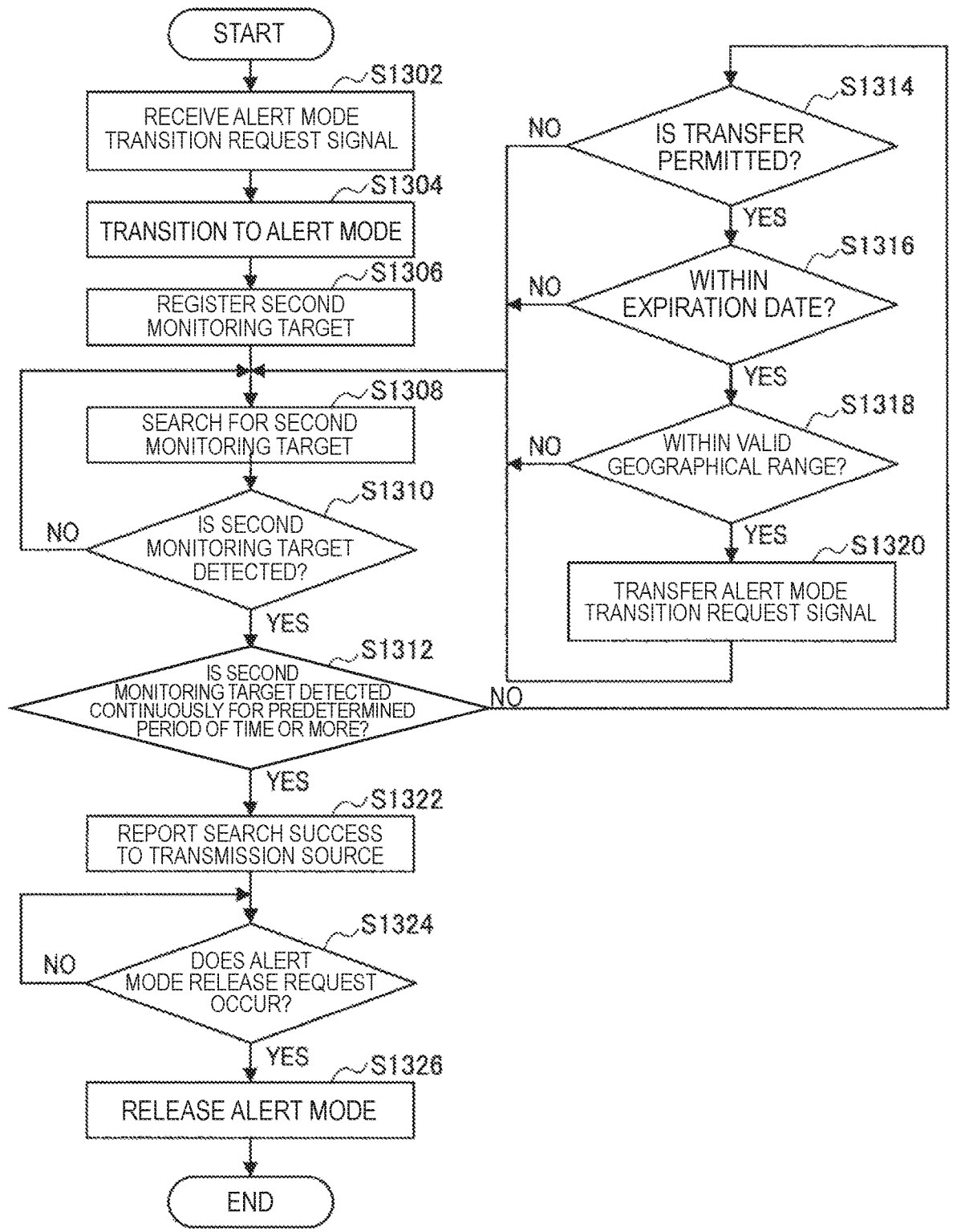
FIG. 22 is a flowchart illustrating an example of a flow of a transfer process of an alert mode transition request signal executed in a robot of a transfer source according to the present embodiment.

FIG. 22 is a flowchart illustrating an example of a flow of a transfer process of the alert mode transition request signal executed in the robot 10 of a transfer source according to the present embodiment. As illustrated in FIG. 22, firstly, in a case in which the robot 10 receives the alert mode transition request signal from another robot 10 (step S1302), the robot 10 transitions to the alert mode (step S1304). Then, the robot 10 registers the second monitoring target indicated by the identification information included in the alert mode transition request signal (step S1306), and searches for the second monitoring target (step S1308). The robot 10 continues to search for the second monitoring target until the second monitoring target is detected (NO in step S1310).

In a case in which the second monitoring target is detected (YES in step S1310), and it fails to continuously detect the second monitoring target for a predetermined period of time or more (NO in step S1312), the robot 10 performs determination related to the transfer of the alert mode transition request signal. Specifically, the robot 10 refers to the transfer permission flag, the information indicating the expiration date, and the information indicating the valid geographical range included in the received alert mode transition request signal. Then, in a case in which it is determined that the transfer is permitted, it is within the expiration date, and it is within the valid geographical range, the robot 10 transfers the alert mode transition request signal (YES in step S1314, YES in S1316, YES in S1318, and S1320). On the other hand, in a case in which it is determined that the transfer is not permitted, it is not within the expiration date, or it is outside the valid geographical range, the robot 10 does not transfer the alert mode transition request signal (NO in step S1314, NO in S1316, and NO in S1318). Thereafter, the robot 10 returns to the search of the second monitoring target (step S1308).

On the other hand, in a case in which the second monitoring target is detected (YES in step S1310), and it succeeds in continuously detecting the second monitoring target for a predetermined period of time or more (YES in step S1312), the robot 10 reports the search success to the robot 10 of the transmission source. Then, the robot 10 is on standby until the alert mode release request occurs (NO in step S1324), and in a case in which the alert mode release request occurs, the alert mode is released (YES in step S1324 and S1326).

4. MODIFIED EXAMPLE

The example in which the robot 10 performs the determination process autonomously on the basis of the sensing data acquired by the robot 10, and performs, for example, the operation of transmitting the alert mode transition request signal has been described above. The present technology is not limited to such an example. For example, the determination process based on the sensing data may be performed by the server 60.

In this case, the server 60 receives the sensing data acquired by the robot 10 for the first monitoring target monitored by the robot 10 and the position information of the robot 10, and stores (that is, sequentially accumulates and updates) the position information received from the robot 10. Then, the server 60 determines whether or not the first monitoring target is in the abnormal state on the basis of the sensing data of the robot 10. In a case in which it is determined that the first monitoring target is abnormal, the server 60 specifies another robot 10 located near the robot 10 with reference to the storage unit 150, and transmits the alert mode transition request signal to another robot 10 which is specified. For example, in a case in which it is determined that the first monitoring target of the first robot 10 is in the abnormal state on the basis of the sensing data of the first robot 10, the server 60 specifies a second robot 10 located near a first robot 10, and transmits the alert mode transition request signal to the second robot 10. Similarly, in a case in which it is determined that the first monitoring target of the second robot 10 is in the abnormal state on the basis of the sensing data of the second robot 10, the server 60 specifies a first robot 10 located near a second robot 10, and transmits the alert mode transition request signal to the first robot 10.

5. HARDWARE CONFIGURATION EXAMPLE

Figure 23:
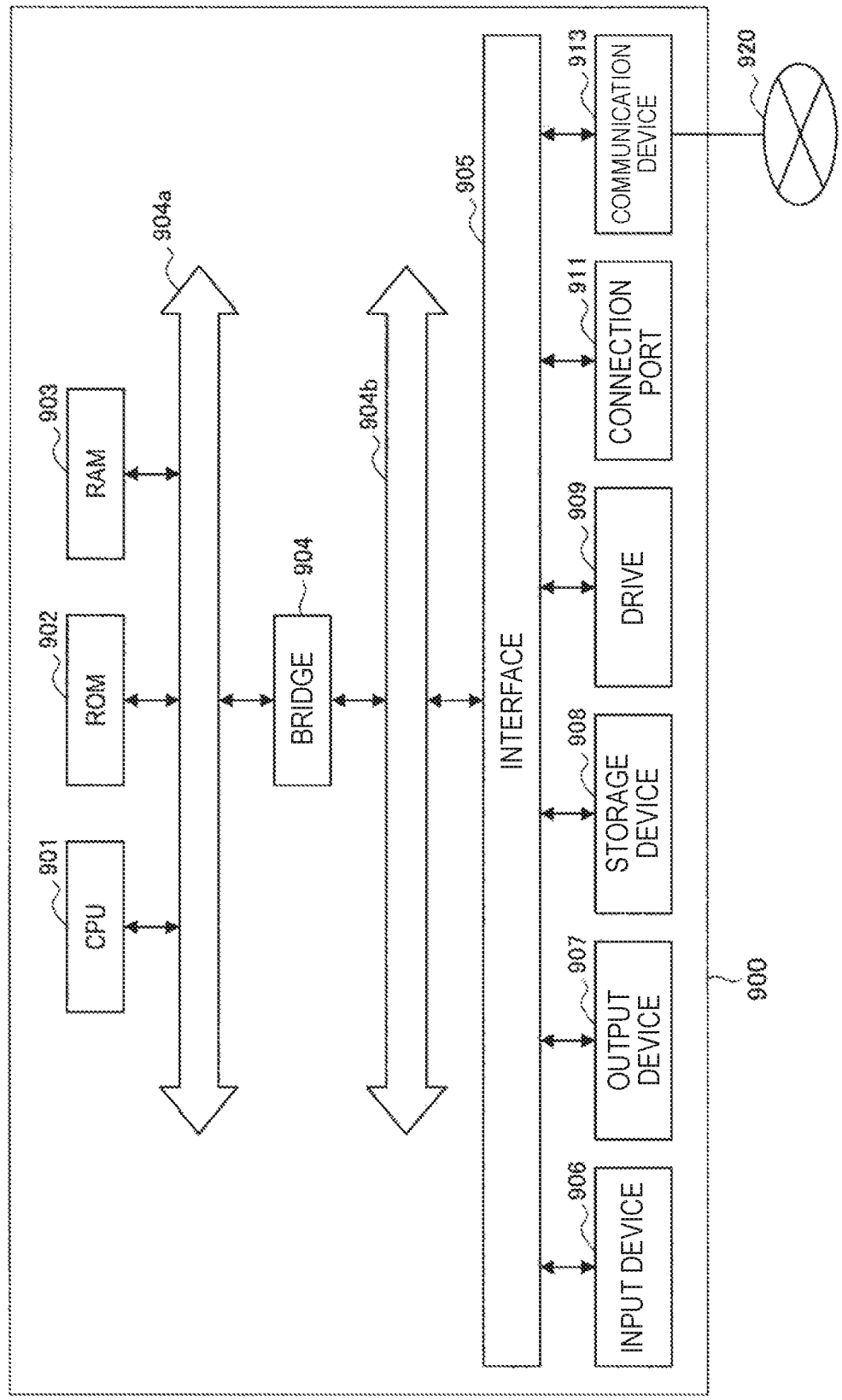
FIG. 23 is a block diagram illustrating an example of a hardware configuration of an information processing apparatus according to the present embodiment.

Finally, a hardware configuration of an information processing apparatus according to the present embodiment will be described with reference to FIG. 23. FIG. 23 is a block diagram illustrating an example of the hardware configuration of the information processing apparatus according to the present embodiment. Meanwhile, an information processing apparatus 900 illustrated in FIG. 23 may realize the robot 10 or the server 60 illustrated in FIG. 3 or 4, respectively, for example. Information processing by the robot 10 or the server 60 according to the present embodiment is realized according to cooperation between software and hardware described below.

As illustrated in FIG. 23, the information processing apparatus 900 includes a central processing unit (CPU) 901, a read only memory (ROM) 902, a random access memory (RAM) 903 and a host bus 904a. In addition, the information processing apparatus 900 includes a bridge 904, an external bus 904b, an interface 905, an input device 906, an output device 907, a storage device 908, a drive 909, a connection port 911 and a communication device 913. The information processing apparatus 900 may include a processing circuit such as an electric circuit, a DSP or an ASIC instead of the CPU 901 or along therewith.

The CPU 901 functions as an arithmetic processing device and a control device and controls the overall operation in the information processing apparatus 900 according to various programs. Further, the CPU 901 may be a microprocessor. The ROM 902 stores programs, operation parameters and the like used by the CPU 901. The RAM 903 temporarily stores programs used in execution of the CPU 901, parameters appropriately changed in the execution, and the like. The CPU 901 can form the processing unit 160 illustrated in FIG. 3 or the processing unit 630 illustrated in FIG. 4, for example.

The CPU 901, the ROM 902 and the RAM 903 are connected by the host bus 904a including a CPU bus and the like. The host bus 904a is connected with the external bus 904b such as a peripheral component interconnect/interface (PCI) bus via the bridge 904. Further, the host bus 904a, the bridge 904 and the external bus 904b are not necessarily separately configured and such functions may be mounted in a single bus.

The input device 906 is realized by a device through which a user inputs information, such as a mouse, a keyboard, a touch panel, a button, a microphone, a switch, and a lever. In addition, the input device 906 may be a remote control device using infrared ray or other electric waves or external connection equipment such as a mobile phone or a PDA corresponding to operation of the information processing apparatus 900, for example. Furthermore, the input device 906 may include an input control circuit or the like which generates an input signal on the basis of information input by the user using the aforementioned input means and outputs the input signal to the CPU 901, for example. The user of the information processing apparatus 900 may input various types of data or order a processing operation for the information processing apparatus 900 by operating the input device 906.

In addition to the above, the input device 906 can be formed by a device that detects information related to the user. For example, the input device 906 can include various sensors such as an image sensor (a camera, for example), a depth sensor (a stereo camera, for example), an acceleration sensor, a gyro sensor, a geomagnetic sensor, an optical sensor, a sound sensor, a distance measurement sensor, and a force sensor. Also, the input device 906 may acquire information related to the state of the information processing apparatus 900 itself such as the posture and the moving velocity of the information processing apparatus 900 and information related to a surrounding environment of the information processing apparatus 900 such as brightness or noise around the information processing apparatus 900. Also, the input device 906 may include a GNSS module that receives a GNSS signal (a GPS signal from a global positioning system (GPS) satellite, for example) from a global navigation satellite system (GNSS) satellite and measures position information including the latitude, the longitude, and the altitude of the device. In addition, the input device 906 may detect the position through Wi-Fi (registered trademark), transmission and reception to and from a mobile phone, a PHS, a smartphone, or the like, near-field communication, or the like, in relation to the position information. The input device 906 can form the sensor 110 illustrated in FIG. 3, for example.

The output device 907 is formed by a device that may visually or aurally notify the user of acquired information. As such devices, there is a display device such as a CRT display device, a liquid crystal display device, a plasma display device, an EL display device, a laser projector, an LED projector or a lamp, a sound output device such as a speaker and a headphone, a printer device and the like. The output device 907 outputs results acquired through various processes performed by the information processing apparatus 900, for example. Specifically, the display device visually displays results acquired through various processes performed by the information processing apparatus 900 in various forms such as text, images, tables and graphs. On the other hand, the sound output device converts audio signals including reproduced sound data, audio data and the like into analog signals and aurally outputs the analog signals. The aforementioned display device and the aforementioned sound output device may form the notifying unit 130 illustrated in FIG. 3, for example.

In addition, the output device 907 may be constituted by a drive device which is capable of outputting, that is, driving, an operation on the basis of the acquired information. As such a device, for example, for the bird type robot 10, there are battery, an actuator such as a motor, a feather, a propeller, a conversion device that converts rotation of the motor into motions of wings, and the like. Further, as such a device, for example, for a dog type robot 10, there are a battery, an actuator such as a motor, a rigid body forming a leg portion, a link mechanism including a joint, a posture control device, and the like. The driving device may constitute, for example, the drive unit 140 illustrated in FIG. 3.

The storage device 908 is a device for data storage, formed as an example of a storage unit of the information processing apparatus 900. For example, the storage device 908 is realized by a magnetic storage device such as an HDD, a semiconductor storage device, an optical storage device, a magneto-optical storage device or the like. The storage device 908 may include a storage medium, a recording device for recording data on the storage medium, a reading device for reading data from the storage medium, a deletion device for deleting data recorded on the storage medium and the like. The storage device 908 stores programs and various types of data executed by the CPU 901, various types of data acquired from the outside and the like. The storage device 908 may form the storage unit 150 illustrated in FIG. 3 or the storage unit 620 illustrated in FIG. 4, for example.

The drive 909 is a reader/writer for storage media and is included in or externally attached to the information processing apparatus 900. The drive 909 reads information recorded on a removable storage medium such as a magnetic disc, an optical disc, a magneto-optical disc or a semiconductor memory mounted thereon and outputs the information to the RAM 903. In addition, the drive 909 can write information on the removable storage medium.

The connection port 911 is an interface connected with external equipment and is a connector to the external equipment through which data may be transmitted through a universal serial bus (USB) and the like, for example.

The communication device 913 is a communication interface formed by a communication device for connection to a network 920 or the like, for example. The communication device 913 is a communication card or the like for a wired or wireless local area network (LAN), long term evolution (LTE), Bluetooth (registered trademark) or wireless USB (WUSB), for example. In addition, the communication device 913 may be a router for optical communication, a router for asymmetric digital subscriber line (ADSL), various communication modems or the like. For example, the communication device 913 may transmit/receive signals and the like to/from the Internet and other communication apparatuses according to a predetermined protocol, for example, TCP/IP or the like. The communication device 913 may form the communication unit 120 illustrated in FIG. 3, or the communication unit 610 illustrated in FIG. 4, for example.

Further, the network 920 is a wired or wireless transmission path of information transmitted from devices connected to the network 920. For example, the network 920 may include a public circuit network such as the Internet, a telephone circuit network or a satellite communication network, various local area networks (LANs) including Ethernet (registered trademark), a wide area network (WAN) and the like. In addition, the network 920 may include a dedicated circuit network such as an internet protocol-virtual private network (IP-VPN).

Hereinbefore, an example of a hardware configuration capable of realizing the functions of the information processing apparatus 900 according to the present embodiment is shown. The respective components may be implemented using universal members, or may be implemented by hardware specific to the functions of the respective components. Accordingly, according to a technical level at the time when the embodiments are executed, it is possible to appropriately change hardware configurations to be used.

In addition, a computer program for realizing each of the functions of the information processing apparatus 900 according to the present embodiment as described above may be created, and may be mounted in a PC or the like. Furthermore, a computer-readable recording medium on which such a computer program is stored may be provided. The recording medium is a magnetic disc, an optical disc, a magneto-optical disc, a flash memory, or the like, for example. Further, the computer program may be delivered through a network, for example, without using the recording medium.

6. CONCLUSION

One embodiment of the present disclosure has been described in detail with reference to FIGS. 1 to 23. As described above, the robot 10 according to the present embodiment constitutes the robot system 1 including a plurality of robots 10 having the function of identifying the monitoring target and transmitting the information related to the monitoring target to the remote site. The robot 10 acquires the sensing data related to the monitoring target and communicates with other nearby robots. For example, if it is determined on the basis of the sensing data that the first monitoring target is in the abnormal state, the robot 10 transmits the alert mode transition request signal to other nearby robots, and if the alert mode transition request signal related to the second monitoring target is received, the robot 10 transitions to the alert mode in which the process according to the received alert mode transition request signal is performed. Accordingly, the robot 10 can implement both the provision of the service of monitoring the first monitoring target monitored by itself and assistance to the provision of the service of monitoring the second monitoring target (the first monitoring target to another robot 10) by other users.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above embodiment, the monitoring target is described as being a person, but the present technology is not limited to such an example. For example, the monitoring target may be an animal such as a dog or a cat, a plant, or an inorganic object such as a car.

Note that it is not necessary for the processing described in this specification with reference to the flowchart and the sequence diagram to be executed in the order shown in the flowchart. Some processing steps may be performed in parallel. Further, some of additional steps can be adopted, or some processing steps can be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A robot in a robot system including a plurality of robots each having a function of identifying a monitoring target and transmitting information related to the monitoring target to a remote site, the robot including:
an acquiring unit configured to acquire sensing data related to the monitoring target;
a communication unit configured to communicate with another nearby robot; and
a control unit configured to control the communication unit such that an alert mode transition request signal is transmitted to the other nearby robot if it is determined that a first monitoring target is in an abnormal state on a basis of the sensing data and transition to an alert mode in which a process according to the received alert mode transition request signal is performed if the alert mode transition request signal related to a second monitoring target is received.

(2)

The robot according to (1), in which the control unit determines a state in which the first monitoring target is not present within a monitorable range of the robot as the abnormal state.

(3)

The robot according to (2), in which the alert mode transition request signal includes identification information identifying the second monitoring target determined not to be present within the monitorable range, and
the control unit searches for the second monitoring target indicated by the identification information included in the received alert mode transition request signal in the alert mode.

(4)

The robot according to (3), in which the control unit controls the communication unit such that information indicating search success is transmitted to another robot which is a transmission source of the alert mode transition request signal in a case in which the searching is successfully performed.

(5)

The robot according to (3) or (4), in which, in a case in which the second monitoring target is not present after being present within the monitorable range, the control unit controls the communication unit such that the alert mode transition request signal including the identification information of the second monitoring target is transmitted to another nearby robot.

(6)

The robot according to any one of (2) to (5), in which the control unit ends the alert mode if it is recognized that another robot of a transmission source of the alert mode transition request signal succeeds in searching for the second monitoring target.

(7)

The robot according to any one of (1) to (6), in which the control unit determines the abnormal state of the first monitoring target present within a monitorable range of the robot.

(8)

The robot according to (7), further including:
a notifying unit configured to notify a nearby person of the abnormal state of the first monitoring target,
in which, if it is determined that the first monitoring target is in the abnormal state on the basis of the sensing data, the control unit transitions to the alert mode and controls the notifying unit such that a notification indicating the abnormal state is given to the nearby person.

(9)

The robot according to (8), in which, if the alert mode transition request signal is received, the control unit transitions to the alert mode and controls the notifying unit such that a notification of information included in the received alert mode transition request signal is given to the first monitoring target.

(10)

The robot according to (9), in which the control unit searches for another robot of a transmission source of the alert mode transition request signal in the alert mode.

(11)

The robot according to any one of (1) to (10), in which, if a specific monitoring target associated with the first monitoring target is identified on the basis of the sensing data, the control unit transitions to a group monitoring mode in which the specific monitoring target is also set as the monitoring target along with the first monitoring target.

(12)

The robot according to (11), in which, in a case in which another robot that monitors the specific monitoring target also transitions to a group monitoring mode in which the first monitoring target is monitored, the control unit performs charging.

(13)

The robot according to any one of (1) to (12), in which the control unit controls whether or not a transition to the alert mode according to the received alert mode transition request signal is performed in accordance with a state of the first monitoring target recognized on the basis of the sensing data.

(14)

The robot according to (13), in which the control unit controls whether or not the transition to the alert mode according to the received alert mode transition request signal is performed in accordance with a recognized emotion of the first monitoring target.

(15)

The robot according to (13) or (14), in which the control unit controls whether or not the transition to the alert mode according to the received alert mode transition request signal is performed in accordance with whether or not the first monitoring target is in a sleep state.

(16)

The robot according to any one of (1) to (15), in which the alert mode transition request signal includes position information of another robot of a transmission source and information indicating an abnormal state of a second monitoring target.

(17)

The robot according to any one of (1) to (16), further including: a drive unit configured to move in a real space, in which the control unit controls the drive unit under a condition that the first monitoring target is included within a monitorable range of the robot.

(18)
The robot according to (17), in which the control unit releases the condition in a case in which another robot transitions to a group monitoring mode in which the first monitoring target is monitored.

(19)
An information processing apparatus in a robot system capable of communicating with a plurality of robots capable of monitoring a monitoring target, the information processing apparatus including:
a communication unit configured to receive sensing data acquired by the robot for the monitoring target monitored by the robot and position information of the robot;
a storage unit configured to store the position information received from the robot; and
a control unit configured to specify a second robot located near a first robot with reference to the storage unit if it is determined that a monitoring target of the first robot is in an abnormal state on a basis of sensing data of the first robot, control the communication unit such that an alert mode transition request signal is transmitted to the second robot,
specify the first robot located near the second robot with reference to the storage unit if it is determined that a monitoring target of the second robot is in an abnormal state on a basis of sensing data of the second robot, and control the communication unit such that an alert mode transition request signal is transmitted to the first robot.

(20)
A recording medium having a program recorded therein, the program causing a computer to function as:
in a robot system including a plurality of robots each having a function of identifying a monitoring target and transmitting information related to the monitoring target to a remote site,
an acquiring unit configured to acquire sensing data related to the monitoring target;
a communication unit configured to communicate with another nearby robot; and
a control unit configured to control the communication unit such that an alert mode transition request signal is transmitted to the other nearby robot if it is determined that a first monitoring target is in an abnormal state on a basis of the sensing data and transition to an alert mode in which a process according to the received alert mode transition request signal is performed if the alert mode transition request signal related to a second monitoring target is received.

REFERENCE SIGNS LIST 1 robot system
10 robot
20 owner
30 terminal apparatus
40 family member
50 network
60 server
110 sensor
120 communication unit
130 notifying unit
140 drive unit
150 storage unit
160 processing unit
161 acquiring unit
163 operation control unit 610 communication unit
620 storage unit
630 processing unit
631 managing unit
633 monitoring support unit

The invention claimed is:

1. A first robot, comprising:
a processor configured to:
acquire sensing data related to a first monitoring target;
determine the first monitoring target is in a first abnormal state based on the sensing data, and
a distance between the first robot and the first monitoring target that is greater than a specific value, wherein
in the first abnormal state, the first monitoring target is absent within a monitorable range of the first robot;
control, based on the determination that the first monitoring target is in the first abnormal state, transmission of a first alert mode transition request signal to a second robot;
control reception of a second alert mode transition request signal related to a second monitoring target;
transition to an alert mode based on the received second alert mode transition request signal;
execute a specific process in the alert mode;
identify a specific monitoring target associated with the first monitoring target based on the sensing data;
transition to a group monitoring mode based on the identification of the specific monitoring target;
monitor, in the group monitoring mode, the specific monitoring target and the first monitoring target; and
execute a charging operation in a case in which a third robot monitors the specific monitoring target and transitions to the group monitoring mode.

2. The first robot according to claim 1, wherein
the received second alert mode transition request signal includes identification information that indicates the second monitoring target,
the second monitoring target is absent within a monitorable range of the second robot, and
the processor, in the alert mode, is further configured to search for the second monitoring target indicated by the identification information.

3. The first robot according to claim 2, wherein
the processor is further configured to control transmission of information to the second robot,
the information indicates that the search for the second monitoring target is successful, and
the second robot is a transmission source of the second alert mode transition request signal.

4. The first robot according to claim 2, wherein in a case in which the second monitoring target is absent after being present within the monitorable range of the first robot, the processor is further configured to control transmission of the received second alert mode transition request signal to a third robot.

5. The first robot according to claim 1, wherein
the processor is further configured to end the alert mode based a successful search of the second monitoring target by the second robot, and
the second robot is a transmission source of the second alert mode transition request signal.

6. The first robot according to claim 1, wherein the processor is further configured to determine a second abnormal state of the first monitoring target present within the monitorable range of the first robot.

7. The first robot according to claim 6, wherein the processor is further configured to:
    determine the second abnormal state of the first monitoring target based on the sensing data;
    transition to the alert mode based on the second abnormal state of the first monitoring target; and
    control output of a first notification indicating the second abnormal state of the first monitoring target.

8. The first robot according to claim 7, wherein
    the received second alert mode transition request signal includes specific information,
    the processor is further configured to control output of a second notification to the first monitoring target, and
    the second notification indicates the specific information.

9. The first robot according to claim 8, wherein the processor, in the alert mode, is further configured to search for the second robot that is a transmission source of the second alert mode transition request signal.

10. The first robot according to claim 1, wherein the processor is further configured to:
    recognize a specific state of the first monitoring target based on the sensing data; and
    transition to the alert mode based on the recognized specific state of the first monitoring target.

11. The first robot according to claim 10, wherein the processor is further configured to:
    recognize an emotion of the first monitoring target; and
    transition to the alert mode based on the recognized emotion of the first monitoring target.

12. The first robot according to claim 10, wherein the processor is further configured to:
    recognize the specific state of the first monitoring target as a sleep state; and
    transition to the alert mode based on the sleep state of the first monitoring target.

13. The first robot according to claim 1, wherein
    the second alert mode transition request signal includes position information of the second robot and information indicating an abnormal state of the second monitoring target, and
    the second robot is a transmission source of the second alert mode transition request signal.

14. The first robot according to claim 1, further comprising a drive unit configured to move in a real space,
    wherein the processor is further configured to control the drive unit based on a condition that the first monitoring target is included within the monitorable range of the first robot.

15. The first robot according to claim 14, wherein
    the processor is further configured to release the condition based on the transition of the third robot to the group monitoring mode.

16. An information processing apparatus, comprising:
    a memory; and
    a processor configured to:
        control reception of position information of a first robot and first sensing data acquired by the first robot, wherein
            the first sensing data is related to a first monitoring target monitored by the first robot, and
            the memory is configured to store the position information of the first robot;
        determine the first monitoring target is in a first abnormal state based on the first sensing data, and
            a distance between the first robot and the first monitoring target that is greater than a specific value,
            wherein in the first abnormal state, the first monitoring target is absent within a monitorable range of the first robot;
        specify a second robot located at a specific position from the first robot, based on the stored position information and the determination that the first monitoring target is in the first abnormal state;
        control transmission of a first alert mode transition request signal to the second robot;
        determine a second monitoring target of the second robot is in a second abnormal state based on second sensing data of the second robot;
        specify the first robot with reference to the memory based on the determination that the second monitoring target of the second robot is in the second abnormal state; and
        control transmission of a second alert mode transition request signal to the first robot, wherein
        the first robot identifies a specific monitoring target associated with the first monitoring target based on the first sensing data;
        the first robot transitions to a group monitoring mode based on the identification of the specific monitoring target;
        the first robot monitors, in the group monitoring mode, the specific monitoring target and the first monitoring target; and
        the first robot executes a charging operation in a case in which a third robot monitors the specific monitoring target and transitions to the group monitoring mode.

17. A non-transitory computer-readable medium having stored thereon computer-executable instructions which, when executed by a processor, cause the processor to execute operations, the operations comprising:
    acquiring sensing data related to a first monitoring target monitored by a first robot;
    determining the first monitoring target is in an abnormal state based on the sensing data, and
        a distance between the first robot and the first monitoring target that is greater than a specific value, wherein
        in the abnormal state, the first monitoring target is absent within a monitorable range of the first robot;
    controlling, based on the determination that the first monitoring target is in the abnormal state, transmission of a first alert mode transition request signal to a second robot;
    controlling reception of a second alert mode transition request signal related to a second monitoring target;
    transitioning to an alert mode based on the received second alert mode transition request signal;
    executing a specific process in the alert mode;
    identifying a specific monitoring target associated with the first monitoring target based on the sensing data;
    transitioning to a group monitoring mode based on the identification of the specific monitoring target;
    monitoring, in the group monitoring mode, the specific monitoring target and the first monitoring target; and
    executing a charging operation in a case in which a third robot monitors the specific monitoring target and transitions to the group monitoring mode.

18. A first robot, comprising:
    a processor configured to:
        acquire sensing data related to a first monitoring target;
        determine the first monitoring target is in an abnormal state based on the sensing data;

control, based on the determination that the first monitoring target is in the abnormal state, transmission of a first alert mode transition request signal to a second robot;
control reception of a second alert mode transition request signal related to a second monitoring target;
recognize the first monitoring target is in a sleep state based on the sensing data;
transition to an alert mode based on the received second alert mode transition request signal and the recognition of the first monitoring target is in the sleep state; and
execute a specific process in the alert mode.

\* \* \* \* \*